US012676557B2

(12) United States Patent
Wang

(10) Patent No.: US 12,676,557 B2
(45) Date of Patent: Jul. 7, 2026

(54) DIRECT CURRENT TO DIRECT CURRENT (DCDC) CONVERTER WITH MULTIPLE DC-DC CONVERSION MODULES AND CONTROL METHOD THEREOF

(71) Applicant: Ace Power and Technology Co., Ltd, Shanghai (CN)

(72) Inventor: Yuetian Wang, Shanghai (CN)

(73) Assignee: Ace Power and Technology Co., Ltd, Shanghai (CN)

( * ) Notice: Subject to any disclaimer, the term of this patent is extended or adjusted under 35 U.S.C. 154(b) by 128 days.

(21) Appl. No.: 18/579,308

(22) PCT Filed: Aug. 18, 2022

(86) PCT No.: PCT/CN2022/113394
§ 371 (c)(1),
(2) Date: Jan. 12, 2024

(87) PCT Pub. No.: WO2023/098146
PCT Pub. Date: Jun. 8, 2023

(65) Prior Publication Data
US 2024/0348170 A1 Oct. 17, 2024

(30) Foreign Application Priority Data
Dec. 3, 2021 (CN) .......................... 202111470872.0

(51) Int. Cl.
*H02M 3/335* (2006.01)
*H02M 1/00* (2006.01)
(Continued)

(52) U.S. Cl.
CPC ..... *H02M 3/33584* (2013.01); *H02M 1/0058* (2021.05); *H02M 1/088* (2013.01);
(Continued)

(58) Field of Classification Search
CPC ........... H02M 3/33584; H02M 1/0058; H02M 1/088; H02M 3/01; H02M 3/335; H02M 3/3353; Y02B 70/10
See application file for complete search history.

(56) References Cited

U.S. PATENT DOCUMENTS

| | | | |
|---|---|---|---|
| 5,631,814 A | 5/1997 | Zak | |
| 10,298,023 B2 | 5/2019 | Liao et al. | |
| | (Continued) | | |

FOREIGN PATENT DOCUMENTS

| | | |
|---|---|---|
| CN | 101662231 A | 3/2010 |
| CN | 102739033 A | 10/2012 |
| | (Continued) | |

OTHER PUBLICATIONS

U.S. Appl. No. 18/579,327, entitled "Three-Level Control Circuit, Power Conversion Device, and Control Method Thereof," filed on Jan. 12, 2024.
(Continued)

*Primary Examiner* — Yusef A Ahmed
(74) *Attorney, Agent, or Firm* — Hamilton, Brook, Smith & Reynolds, P.C.

(57) ABSTRACT
A Direct Current to Direct Current (DCDC) Converter with Multiple DC-DC Conversion Modules includes: at least one DCDC conversion module and a controller, wherein each of the DCDC conversion modules has two bidirectional isolated DCDC units connected in parallel, each of the bidirectional isolated DCDC units integrates a resonant circuit and a non-isolated buck/boost circuit connected in cascade; if the number of the DCDC conversion modules is greater than or equal to 2, the DCDC conversion modules are connected in parallel; the controller is connected to each of the bidirectional isolated DCDC units, and control current sharing among the non-isolated buck/boost circuits. Avoiding the use of a complex transformer structure reduces the
(Continued)

manufacturing cost of the Direct Current to Direct Current (DCDC) converter.

9 Claims, 7 Drawing Sheets

(51) Int. Cl.
    *H02M 1/088*     (2006.01)
    *H02M 3/00*     (2006.01)

(52) U.S. Cl.
    CPC ............. *H02M 3/01* (2021.05); *H02M 3/335*
    (2013.01); *H02M 3/3353* (2013.01)

(56)             References Cited

U.S. PATENT DOCUMENTS

| | | | | |
|---|---|---|---|---|
| 10,873,265 | B2* | 12/2020 | Xue | H02M 3/33584 |
| 11,005,378 | B2 | 5/2021 | Medina-Garcia | |
| 11,018,592 | B2 | 5/2021 | Ausseresse et al. | |
| 11,942,872 | B2* | 3/2024 | Chang | H02M 1/0064 |
| 2008/0174276 | A1 | 7/2008 | Takahashi et al. | |
| 2009/0236916 | A1 | 9/2009 | Nishimura | |
| 2011/0090717 | A1* | 4/2011 | Lee | H02M 3/33584 |
| | | | | 363/21.02 |
| 2012/0320638 | A1* | 12/2012 | Boysen | H02M 3/3376 |
| | | | | 363/21.02 |
| 2013/0099720 | A1 | 4/2013 | Chuah et al. | |
| 2013/0162048 | A1* | 6/2013 | Kim | H02J 1/001 |
| | | | | 307/82 |
| 2013/0332642 | A1 | 12/2013 | Capezza | |
| 2014/0063874 | A1* | 3/2014 | Liu | H02J 3/381 |
| | | | | 363/40 |
| 2014/0312862 | A1 | 10/2014 | Xie et al. | |
| 2015/0162782 | A1 | 6/2015 | Kanakasabai et al. | |
| 2015/0180350 | A1* | 6/2015 | Huang | H02M 3/33584 |
| | | | | 307/66 |
| 2016/0020016 | A1* | 1/2016 | Ouyang | H01F 27/34 |
| | | | | 363/21.04 |
| 2016/0034333 | A1 | 2/2016 | Ozawa et al. | |
| 2016/0225559 | A1 | 8/2016 | Ueki | |
| 2016/0241137 | A1* | 8/2016 | Sun | H02J 5/00 |
| 2016/0329811 | A1* | 11/2016 | Du | H02M 1/14 |
| 2017/0085189 | A1* | 3/2017 | Madsen | H02M 1/44 |
| 2017/0237332 | A1 | 8/2017 | Takahashi et al. | |
| 2018/0067885 | A1 | 3/2018 | Hsieh et al. | |
| 2018/0198373 | A1* | 7/2018 | Torrico-Bascopé | H02M 1/083 |
| 2018/0294734 | A1 | 10/2018 | Song et al. | |
| 2018/0302005 | A1 | 10/2018 | Cui et al. | |
| 2018/0337606 | A1 | 11/2018 | Ausseresse et al. | |
| 2018/0367042 | A1 | 12/2018 | Andersen et al. | |
| 2019/0033953 | A1 | 1/2019 | Kadgi et al. | |
| 2019/0036442 | A1 | 1/2019 | Oh | |
| 2019/0044372 | A1 | 2/2019 | Cochran | |
| 2019/0379292 | A1* | 12/2019 | Fei | H01F 3/14 |
| 2020/0021200 | A1 | 1/2020 | Medina-Garcia | |
| 2020/0142463 | A1 | 5/2020 | Hand et al. | |
| 2020/0204079 | A1* | 6/2020 | Guo | H02M 3/285 |
| 2021/0044208 | A1* | 2/2021 | Li | H02M 3/33584 |
| 2021/0058004 | A1* | 2/2021 | Maki | H02M 1/4275 |
| 2021/0067048 | A1* | 3/2021 | Zhang | H02M 3/01 |
| 2021/0099097 | A1* | 4/2021 | Zhang | H02M 3/33592 |
| 2021/0193366 | A1 | 6/2021 | Wang et al. | |
| 2021/0203168 | A1 | 7/2021 | Sharma et al. | |
| 2021/0281164 | A1 | 9/2021 | Lai et al. | |
| 2021/0344211 | A1 | 11/2021 | Yu et al. | |
| 2021/0366645 | A1* | 11/2021 | Lu | H01F 3/10 |
| 2022/0006390 | A1* | 1/2022 | Kim | H02M 1/40 |
| 2022/0014099 | A1* | 1/2022 | Kim | H02M 7/4815 |
| 2022/0107675 | A1 | 4/2022 | Kim et al. | |
| 2022/0140738 | A1* | 5/2022 | Lin | H02M 3/33584 |
| | | | | 363/17 |
| 2022/0404891 | A1 | 12/2022 | Wang et al. | |
| 2023/0068669 | A1 | 3/2023 | Hanaoka et al. | |
| 2023/0205288 | A1 | 6/2023 | Wang | |
| 2023/0208273 | A1 | 6/2023 | Wang | |
| 2023/0223831 | A1* | 7/2023 | Huang | H02M 7/4807 |
| | | | | 363/17 |
| 2023/0223861 | A1* | 7/2023 | Everts | H02J 7/02 |
| | | | | 363/125 |
| 2023/0327578 | A1* | 10/2023 | Zhang | H02M 1/4258 |
| 2023/0361679 | A1* | 11/2023 | Peluso | H02M 3/1586 |
| 2023/0398889 | A1* | 12/2023 | Maruyama | H02M 3/33584 |
| 2024/0007007 | A1* | 1/2024 | Yaqoob | H02M 3/33571 |
| 2024/0128008 | A1* | 4/2024 | Da-Cunha-Alves | H01F 30/12 |
| 2024/0213884 | A1* | 6/2024 | Wan | H02M 1/0058 |
| 2024/0305103 | A1 | 9/2024 | Wang | |
| 2024/0313628 | A1* | 9/2024 | Zheng | H02M 1/123 |
| 2024/0339941 | A1 | 10/2024 | Wang | |
| 2024/0396436 | A1* | 11/2024 | Zhang | H01G 2/08 |
| 2025/0125735 | A1* | 4/2025 | Bae | H02M 3/33584 |
| 2025/0262944 | A1* | 8/2025 | Wang | H02M 3/33584 |

FOREIGN PATENT DOCUMENTS

| | | |
|---|---|---|
| CN | 103178703 A | 6/2013 |
| CN | 103227566 A | 7/2013 |
| CN | 103683964 A | 3/2014 |
| CN | 104079195 A | 10/2014 |
| CN | 104253559 A | 12/2014 |
| CN | 104901536 A | 9/2015 |
| CN | 106329890 A | 1/2017 |
| CN | 108173433 A | 6/2018 |
| CN | 110138223 A | 8/2019 |
| CN | 110289766 A | 9/2019 |
| CN | 110719046 A | 1/2020 |
| CN | 111404393 A | 7/2020 |
| CN | 111446858 A | 7/2020 |
| CN | 111541257 A | 8/2020 |
| CN | 111600499 A | 8/2020 |
| CN | 211957378 U | 11/2020 |
| CN | 112067886 A | 12/2020 |
| CN | 112072924 A | 12/2020 |
| CN | 112803800 A | 5/2021 |
| CN | 113346756 A | 9/2021 |
| CN | 113364295 A | 9/2021 |
| CN | 113428028 A | 9/2021 |
| CN | 214480232 U | 10/2021 |
| CN | 113760072 A | 12/2021 |
| CN | 114157159 A | 3/2022 |
| CN | 216414195 U | 4/2022 |
| CN | 216599026 U | 5/2022 |
| EP | 3726722 A1 | 10/2020 |
| TW | 201838303 A | 10/2018 |
| WO | 2014/132452 A1 | 9/2014 |
| WO | 2023/098016 A1 | 6/2023 |
| WO | 2023/098146 A1 | 6/2023 |
| WO | 2023/098193 A1 | 6/2023 |

OTHER PUBLICATIONS

Hongtao et al., "Input-parallel-output-parallel Wide-range Bidirectional Isolated DC/DC Converter," Journal of Power Supply, vol. 18, No. 3, pp. 13-20 (2020).

International Search Report and Written Opinion for Int'l Application No. PCT/CN2022/113394, Dated: Nov. 10, 2022 (With English Translation) (6159.1003-001).

CN Search Report for CN Application No. 2021114701562, entitled "Three-level Control Circuit, Power Conversion Device, and Control Method Thereof," mailed on Mar. 27, 2025.

"Inverter Power Technology in New Energy Power Generation," Non-dispatchable grid-connected PV system, 83 pages (With English Abstract).

International Search Report and Written Opinion received for PCT Patent Application No. PCT/CN2022/113394, mailed on Nov. 10, 2022, 12 pages (3 pages of English Translation and 9 pages of Original Document).

(56) References Cited

OTHER PUBLICATIONS

Medina-Garcia, A. et al., "Resonant Hybrid Flyback, a New Topology for High Density Power Adaptors, " Electronics, 7 (12), 363, 12 pages (2018).

* cited by examiner

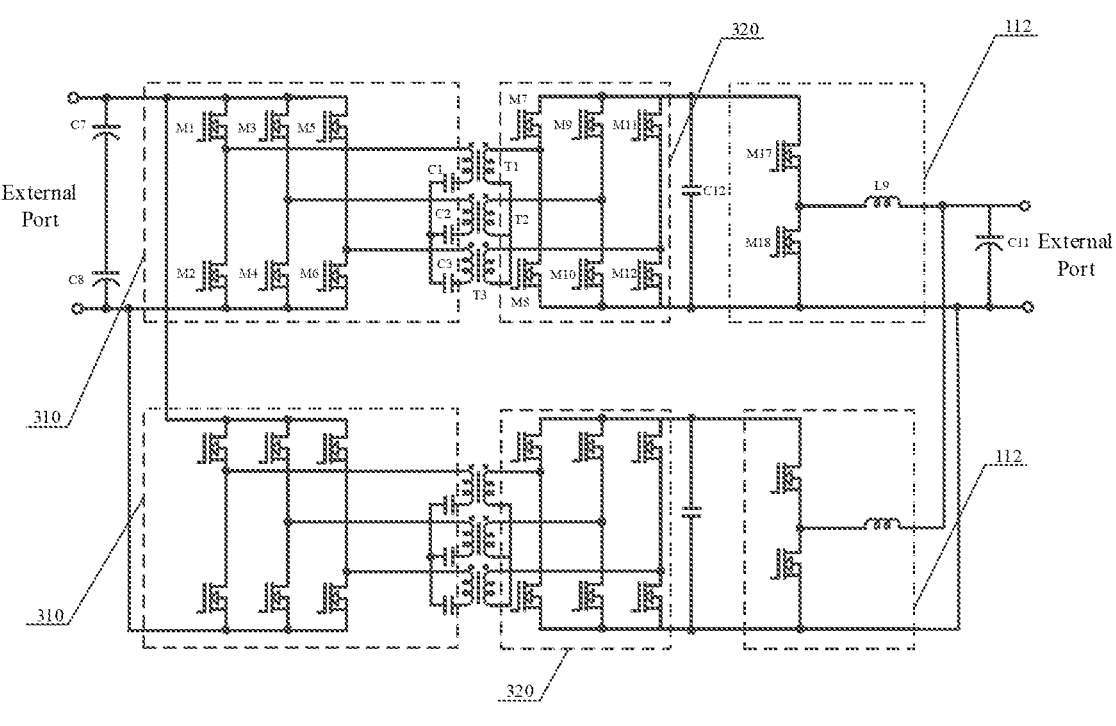

Fig. 13

During an operation in a first direction, controlling driving of the two resonant circuits included in each of the DCDC conversion modules at corresponding positions to be opposite, and controlling each of the non-isolated buck/boost circuits to work in a buck state and causing output current of each of the non-isolated buck/boost circuits to be equal ⟶ S1401

During an operation in a second direction, controlling driving of the two resonant circuits included in each of the DCDC conversion modules at corresponding positions to be opposite, and controlling each of the non-isolated buck/boost circuits to work in a DC boost state and causing output current of each of the non-isolated buck/boost circuits to be equal, wherein the first direction is opposite to the second direction ⟶ S1402

Fig. 14

DIRECT CURRENT TO DIRECT CURRENT (DCDC) CONVERTER WITH MULTIPLE DC-DC CONVERSION MODULES AND CONTROL METHOD THEREOF

RELATED APPLICATIONS

This application is the U.S. National Stage of International Application No. PCT/CN2022/113394, filed on Aug. 18, 2022, which designates the U.S., published in Chinese, and claims priority under 35 U.S.C. § 119 or 365(c) to Chinese Application No. 202111470872.0, filed on Dec. 3, 2021. The entire teachings of the above applications are incorporated herein by reference.

TECHNICAL FIELD

The present disclosure relates to the technical field of power electronic devices, and particularly to a Direct Current to Direct Current (DCDC) converter and a control method thereof.

BACKGROUND

With the popularization of new energy vehicles, the demand for household direct-current charging piles is increasing, and the power requirement of the charging piles is becoming higher.

The charging pile may be equipped with a bidirectional converter, through which not only an electric vehicle can be charged, but also a power battery of the electric vehicle can be used as an emergency power supply. When an electricity price of a grid is relatively cheap, the electric vehicle can be charged, and when a power failure is caused by earthquakes, typhoons and other reasons, the power battery of the electric vehicle can be used as an emergency power supply for household appliances, and at the same time, the power battery may be connected to the grid for power generation in a period where the electricity price is relatively high. As a key link of a bidirectional charging device, the bidirectional converter has a great influence on the performance of the whole device.

SUMMARY

In order to improve the power of a bidirectional converter, a plurality of transformer windings are connected in series, which leads to complex manufacturing, difficult realization and high manufacturing cost of a transformer. Aiming at the problem that a high-power bidirectional converter increases the manufacturing cost of the transformer, the embodiments of the present disclosure provide a bidirectional isolated DCDC converter and a control method thereof, which can at least partially solve the above problem.

In an aspect, the present disclosure provides a Direct Current to Direct Current (DCDC) converter, comprising at least one DCDC conversion module and a controller, wherein:

each of the DCDC conversion modules comprises two bidirectional isolated DCDC units connected in parallel, each of the bidirectional isolated DCDC units comprises a resonant circuit and a non-isolated buck/boost circuit connected in cascade; wherein a working frequency of each of the resonant circuits is fixed; and if the number of the DCDC conversion modules is greater than or equal to 2, the DCDC conversion modules are connected in parallel;

the controller is electrically connected to each of the bidirectional isolated DCDC units, and is configured to control current sharing among the non-isolated buck/boost circuits.

Further, the resonant circuit comprises a three-phase LLC circuit or an LLC extension circuit.

Further, the three-phase LLC circuit comprises a first three-phase circuit, a second three-phase circuit and three transformers, wherein:

the first three-phase circuit is connected to primary sides of the three transformers, and the second three-phase circuit is connected to secondary sides of the three transformers.

Further, the first three-phase circuit comprises a first switch tube, a second switch tube, a third switch tube, a fourth switch tube, a fifth switch tube, a sixth switch tube, a first inductor, a second inductor, a third inductor, a first capacitor, a second capacitor and a third capacitor; the first switch tube and the second switch tube are connected in series, the third switch tube and the fourth switch tube are connected in series, and the fifth switch tube and the sixth switch tube are connected in series; a first end of the first inductor is connected between the first switch tube and the second switch tube, a first end of the second inductor is connected between the third switch tube and the fourth switch tube, and a first end of the third inductor is connected between the fifth switch tube and the sixth switch tube; a second end of the first inductor is connected to a first end of a primary side of a first transformer, a second end of the primary side of the first transformer is connected to a first end of the first capacitor, a second end of the second inductor is connected to a first end of a primary side of a second transformer, a second end of the primary side of the second transformer is connected to a first end of the second capacitor, a second end of the third inductor is connected to a first end of a primary side of a third transformer, a second end of the primary side of the third transformer is connected to a first end of the third capacitor, and a second end of the first capacitor and a second end of the second capacitor are connected to a second end of the third capacitor; or the first three-phase circuit comprises a first switch tube, a second switch tube, a third switch tube, a fourth switch tube, a fifth switch tube, a sixth switch tube, a first capacitor, a second capacitor and a third capacitor; the first switch tube and the second switch tube are connected in series, the third switch tube and the fourth switch tube are connected in series, and the fifth switch tube and the sixth switch tube are connected in series; a first end of a primary side of a first transformer is connected between the first switch tube and the second switch tube, a first end of a primary side of a second transformer is connected between the third switch tube and the fourth switch tube, and a first end of a primary side of a third transformer is connected between the fifth switch tube and the sixth switch tube; a second end of the primary side of the first transformer is connected to a first end of the first capacitor, a second end of the primary side of the second transformer is connected to a first end of the second capacitor, a second end of the primary side of the third transformer is connected to a first end of the third capacitor, and a second end of the first capacitor and a second end of the second capacitor are connected to a second end of the third capacitor; or the first three-phase circuit comprises a first switch tube, a second switch tube, a third switch tube, a fourth switch tube, a fifth switch tube, a sixth switch tube, a first inductor, a second inductor and a third inductor;

the first switch tube and the second switch tube are connected in series, the third switch tube and the fourth switch tube are connected in series, and the fifth switch tube and the sixth switch tube are connected in series; a first end of the first inductor is connected between the first switch tube and the second switch tube, a first end of the second inductor is connected between the third switch tube and the fourth switch tube, and a first end of the third inductor is connected between the fifth switch tube and the sixth switch tube; a second end of the first inductor is connected to a first end of a primary side of a first transformer, a second end of the second inductor is connected to a first end of a primary side of a second transformer, and a second end of the third inductor is connected to a first end of a primary side of a third transformer; a second end of the primary side of the first transformer and a second end of the primary side of the second transformer are connected to a second end of the primary side of the third transformer; or, the first three-phase circuit comprises a first switch tube, a second switch tube, a third switch tube, a fourth switch tube, a fifth switch tube and a sixth switch tube; the first switch tube and the second switch tube are connected in series, the third switch tube and the fourth switch tube are connected in series, and the fifth switch tube and the sixth switch tube are connected in series; a first end of a primary side of a first transformer is connected between the first switch tube and the second switch tube, a first end of a primary side of a second transformer is connected between the third switch tube and the fourth switch tube, and a first end of a primary side of a third transformer is connected between the fifth switch tube and the sixth switch tube; a second end of the primary side of the first transformer and a second end of the primary side of the second transformer are connected to a second end of the primary side of the third transformer.

Further, the second three-phase circuit comprises a seventh switch tube, an eighth switch tube, a ninth switch tube, a tenth switch tube, an eleventh switch tube, a twelfth switch tube, a fourth inductor, a fifth inductor, a sixth inductor, a fourth capacitor, a fifth capacitor and a sixth capacitor; the seventh switch tube and the eighth switch tube are connected in series, the ninth switch tube and the tenth switch tube are connected in series, and the eleventh switch tube and the twelfth switch tube are connected in series; a first end of a secondary side of a first transformer is connected to a first end of the fourth inductor, and a second end of the fourth inductor is connected between the seventh switch tube and the eighth switch tube; a first end of a secondary side of a second transformer is connected to a first end of the fifth inductor, and a second end of the fifth inductor is connected between the ninth switch tube and the tenth switch tube; a first end of a secondary side of the third transformer is connected to a first end of the sixth inductor, and a second end of the sixth inductor is connected between the eleventh switch tube and the twelfth switch tube; a second end of the secondary side of the first transformer is connected to a first end of the fourth capacitor, a second end of the secondary side of the second transformer is connected to a first end of the fifth capacitor, a second end of the secondary side of the third transformer is connected to a first end of the sixth capacitor, and a second end of the fourth capacitor and a second end of the fifth capacitor are connected to a second end of the sixth capacitor; or the second three-phase circuit comprises a seventh switch tube, an eighth switch tube, a ninth switch tube, a tenth switch tube, an eleventh switch tube, a twelfth switch tube, a fourth capacitor, a fifth capacitor and a sixth capacitor; the seventh switch tube and the eighth switch tube are connected in series, the ninth switch tube and the tenth switch tube are connected in series, and the eleventh switch tube and the twelfth switch tube are connected in series; a first end of a secondary side of a first transformer is connected between the seventh switch tube and the eighth switch tube; a first end of a secondary side of a second transformer is connected between the ninth switch tube and the tenth switch tube; a first end of a secondary side of a third transformer is connected between the eleventh switch tube and the twelfth switch tube; a second end of the secondary side of the first transformer is connected to a first end of the fourth capacitor, a second end of the secondary side of the second transformer is connected to a first end of the fifth capacitor, a second end of the secondary side of the third transformer is connected to a first end of the sixth capacitor, and a second end of the fourth capacitor and a second end of the fifth capacitor are connected to a second end of the sixth capacitor; or the second three-phase circuit comprises a seventh switch tube, an eighth switch tube, a ninth switch tube, a tenth switch tube, an eleventh switch tube, a twelfth switch tube, a fourth inductor, a fifth inductor and a sixth inductor; the seventh switch tube and the eighth switch tube are connected in series, the ninth switch tube and the tenth switch tube are connected in series, and the eleventh switch tube and the twelfth switch tube are connected in series; a first end of a secondary side of a first transformer is connected to a first end of the fourth inductor, and a second end of the fourth inductor is connected between the seventh switch tube and the eighth switch tube; a first end of a secondary side of a second transformer is connected to a first end of the fifth inductor, and a second end of the fifth inductor is connected between the ninth switch tube and the tenth switch tube; a first end of a secondary side of a third transformer is connected to a first end of the sixth inductor, and a second end of the sixth inductor is connected between the eleventh switch tube and the twelfth switch tube; a second end of the secondary side of the first transformer and a second end of the secondary side of the second transformer are connected to a second end of the secondary side of the third transformer; or, the second three-phase circuit comprises a seventh switch tube, an eighth switch tube, a ninth switch tube, a tenth switch tube, an eleventh switch tube and a twelfth switch tube; the seventh switch tube and the eighth switch tube are connected in series, the ninth switch tube and the tenth switch tube are connected in series, and the eleventh switch tube and the twelfth switch tube are connected in series; a first end of a secondary side of a first transformer is connected between the seventh switch tube and the eighth switch tube, a first end of a secondary side of a second transformer is connected between the ninth switch tube and the tenth switch tube, a first end of a secondary side of the third transformer is connected between the eleventh switch tube and the twelfth switch tube, and a second end of the secondary side of the first transformer and a second end of the secondary side of the second transformer are connected to a second end of the secondary side of the third transformer.

Further, the non-isolated buck/boost circuit adopts an interleaving buck/boost circuit or a single-stage buck/boost circuit.

Further, the non-isolated buck/boost circuit comprises a first branch, a second branch, a seventh inductor and an eighth inductor, wherein:

the first branch and the second branch are connected in parallel, the first branch comprises a thirteenth switch tube and a fourteenth switch tube connected in series, and the second branch comprises a fifteenth switch tube and a sixteenth switch tube connected in series; a first end of the seventh inductor is connected to a second end of the fifteenth switch tube and a first end of the sixteenth switch tube, a first end of the eighth inductor is connected to a second end of the thirteenth switch tube and a first end of the fourteenth switch tube, and a second end of the seventh inductor is connected to a second end of the eighth inductor.

In another aspect, the present disclosure provides a bidirectional charging and discharging device, comprising the Direct Current to Direct Current (DCDC) converter according to any one of the aforementioned embodiments.

In still another aspect, the present disclosure provides a control method of the Direct Current to Direct Current (DCDC) converter according to any one of the aforementioned embodiments, comprising:

during an operation in a first direction, controlling driving of the two resonant circuits comprised in each of the DCDC conversion modules at corresponding positions to be opposite, and controlling each of the non-isolated buck/boost circuits to work in a buck state and causing output current of each of the non-isolated buck/boost circuits to be equal; and during an operation in a second direction, controlling driving of the two resonant circuits comprised in each of the DCDC conversion modules at corresponding positions to be opposite, and controlling each of the non-isolated buck/boost circuits to work in a DC boost state and causing output current of each of the non-isolated buck/boost circuits to be equal, wherein the first direction is opposite to the second direction.

Further, controlling each of the non-isolated buck/boost circuits to work in a buck state and causing output current of each of the non-isolated buck/boost circuits to be equal comprises:

generating a first current reference value according to a preset voltage reference value and an output voltage sampling value, and adjusting a duty ratio of each of the non-isolated buck/boost circuits according to the first current reference value and the output current sampling value of each of the non-isolated buck/boost circuits, so as to cause the output current of each of the non-isolated buck/boost circuits to be equal.

Further, controlling each of the non-isolated buck/boost circuits to work in a DC boost state and causing output current of each of the non-isolated buck/boost circuits to be equal comprises: controlling each of the non-isolated buck/boost circuits to generate an intermediate bus voltage of each of the bidirectional isolated DCDC units, and obtaining a second current reference value according to an intermediate bus voltage reference value and an intermediate bus voltage sampling value of each of the bidirectional isolated DCDC units; and adjusting a duty ratio of each of the non-isolated buck/boost circuits according to the second current reference value and an input current sampling value of each of the non-isolated buck/boost circuits, so as to cause input current of each of the non-isolated buck/boost circuits to be equal. The embodiments of the present disclosure provide a Direct Current to Direct Current (DCDC) converter and a control method thereof. The Direct Current to Direct Current (DCDC) converter comprises: at least one DCDC conversion module and a controller, wherein each of the DCDC conversion modules comprises two bidirectional isolated DCDC units connected in parallel, each of the bidirectional isolated DCDC units comprises a resonant circuit and a non-isolated buck/boost circuit connected in cascade; the controller is electrically connected to each of the bidirectional isolated DCDC units, and is configured to control current sharing among the non-isolated buck/boost circuits. The method is applied to the Direct Current to Direct Current (DCDC) converter. The power requirement of the Direct Current to Direct Current (DCDC) converter is satisfied by at least one DCDC conversion module, thereby reducing the manufacturing cost of the Direct Current to Direct Current (DCDC) converter.

BRIEF DESCRIPTION OF THE DRAWINGS

In order to more clearly explain the technical solutions in embodiments of the present disclosure or in the prior art, the drawings required for describing the embodiments or the prior art will be briefly introduced below. Obviously, the drawings involved in the following description just illustrate some embodiments of the present disclosure, and those of ordinary skills in the art can obtain other drawings from them without paying any creative effort. In the drawings.

FIG. 13 is a structural diagram of a Direct Current to Direct Current (DCDC) converter according to a thirteenth embodiment of the present disclosure.

FIG. 14 is a flowchart of a control method of a Direct Current to Direct Current (DCDC) converter according to a fourteenth embodiment of the present disclosure.

Figure 1:
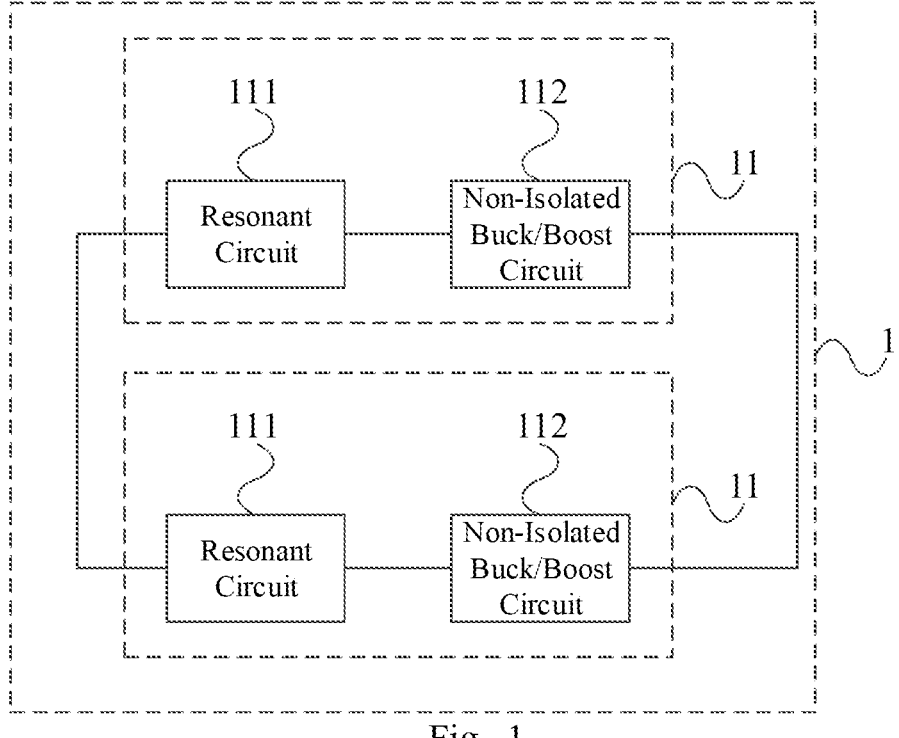
FIG. 1 is a structural diagram of a Direct Current to Direct Current (DCDC) converter according to a first embodiment of the present disclosure.

| Reference numerals: | |
| --- | --- |
| 1: DCDC conversion module; | 11: bidirectional isolated DCDC unit; |
| 111: resonant circuit; | 112: non-isolated buck/boost circuit; |
| 310: first three-phase circuit; | 320: second three-phase circuit; |
| 330: first branch; | 340: second branch. |

DETAILED DESCRIPTION OF THE PREFERRED EMBODIMENTS

In order that the objectives, technical solutions and advantages of the embodiments of the present disclosure are clearer, the embodiments of the present disclosure are further described in detail below with reference to the drawings. Here, the exemplary embodiments of the present disclosure and the description thereof are used to explain, rather than limiting the present disclosure. It should be noted that the embodiments of the present disclosure and the features in the embodiments can be combined with each other arbitrarily without conflict.

In order to facilitate the understanding of the technical solutions provided by the present disclosure, firstly the related content of the technical solutions of the present disclosure will be explained below. In the embodiments of the present disclosure, at least two temperature sensors, or at least two filtering algorithms which are corresponding to a same temperature sensor, are needed to collect temperatures of a target object. In the embodiments of the present disclosure, for the convenience of description, one channel is corresponding to one temperature sensor or one filtering algorithm. A temperature processing method according to the embodiments of the present disclosure may be applied in a temperature detection system of an electric vehicle, or any other scene requiring a temperature collection, which is not limited in the embodiments of the present disclosure.

FIG. 1 is a structural diagram of a Direct Current to Direct Current (DCDC) converter according to a first embodiment of the present disclosure. As illustrated in FIG. 1, the Direct Current to Direct Current (DCDC) converter according to the embodiment of the present disclosure includes at least one DCDC conversion module 1 and a controller, wherein:

each of the DCDC conversion modules 1 includes two bidirectional isolated DCDC units 11 connected in parallel, each of the bidirectional isolated DCDC units includes a resonant circuit 111 and a non-isolated buck/boost circuit 112 connected in cascade; wherein a working frequency of each of the resonant circuits 111 is fixed; and if the number of the DCDC conversion modules 1 is greater than or equal to 2, the DCDC conversion modules 1 are connected in parallel;

the controller is electrically connected to each of the bidirectional isolated DCDC units 11, and is configured to control current sharing among the non-isolated buck/boost circuits 112.

Specifically, the Direct Current to Direct Current (DCDC) converter according to the embodiment of the present disclosure can realize a bidirectional power flow, i.e., the Direct Current to Direct Current (DCDC) converter may charge a connected charging object and work in a charging mode, and may output electric energy stored in the charging object to the outside and work in a power supply mode. In the charging mode, external current flows from the resonant circuit 111 to the non-isolated buck/boost circuit 112 to charge the charging object, wherein the resonant circuit 111 serves for boosting, the non-isolated buck/boost circuit 112 serves for bucking, and the Direct Current to Direct Current (DCDC) converter operates in a first direction. In the power supply mode, current supplied by the charging object flows from the non-isolated buck/boost circuit 112 to the resonant circuit 111, and then is output to the outside. At this time, the non-isolated buck/boost circuit 112 serves for boosting, the resonant circuit 111 serves for bucking, and the Direct Current to Direct Current (DCDC) converter operates in a second direction. In practical uses, the current may be connected to a Power Factor Correction (PFC) circuit from the resonant circuit 111, and the non-isolated buck/boost circuit 112 may be connected to a rechargeable battery.

The controller is configured to drive each of the bidirectional isolated DCDC units and each of the non-isolated buck/boost circuits 112. The controller reduces Electromagnetic Interference (EMI) noise of the Direct Current to Direct Current (DCDC) converter by controlling driving two resonant circuits included in each of the DCDC conversion modules at corresponding positions to be opposite. The controller controls the output current of each of the non-isolated buck/boost circuits to be equal, so as to achieve the current sharing among the non-isolated buck/boost circuits 112. A voltage isolation of each of the resonant circuits 111 is achieved by fixing the working frequency thereof, wherein the controller may adopt a Microcontroller Unit (MCU) or a Digital Signal Processing (DSP) chip.

A power expansion of the Direct Current to Direct Current (DCDC) converter is achieved by increasing the number of the DCDC conversion modules 1, and greater power can be supported as the number of the DCDC conversion modules 1 increases. The number of the DCDC conversion modules 1 is set according to the needs of actual power, e.g., 2 to 10 DCDC conversion modules 1 may be set, which is only an example, and the number of the DCDC conversion modules 1 is not limited in the embodiments of the present disclosure.

Figure 2:
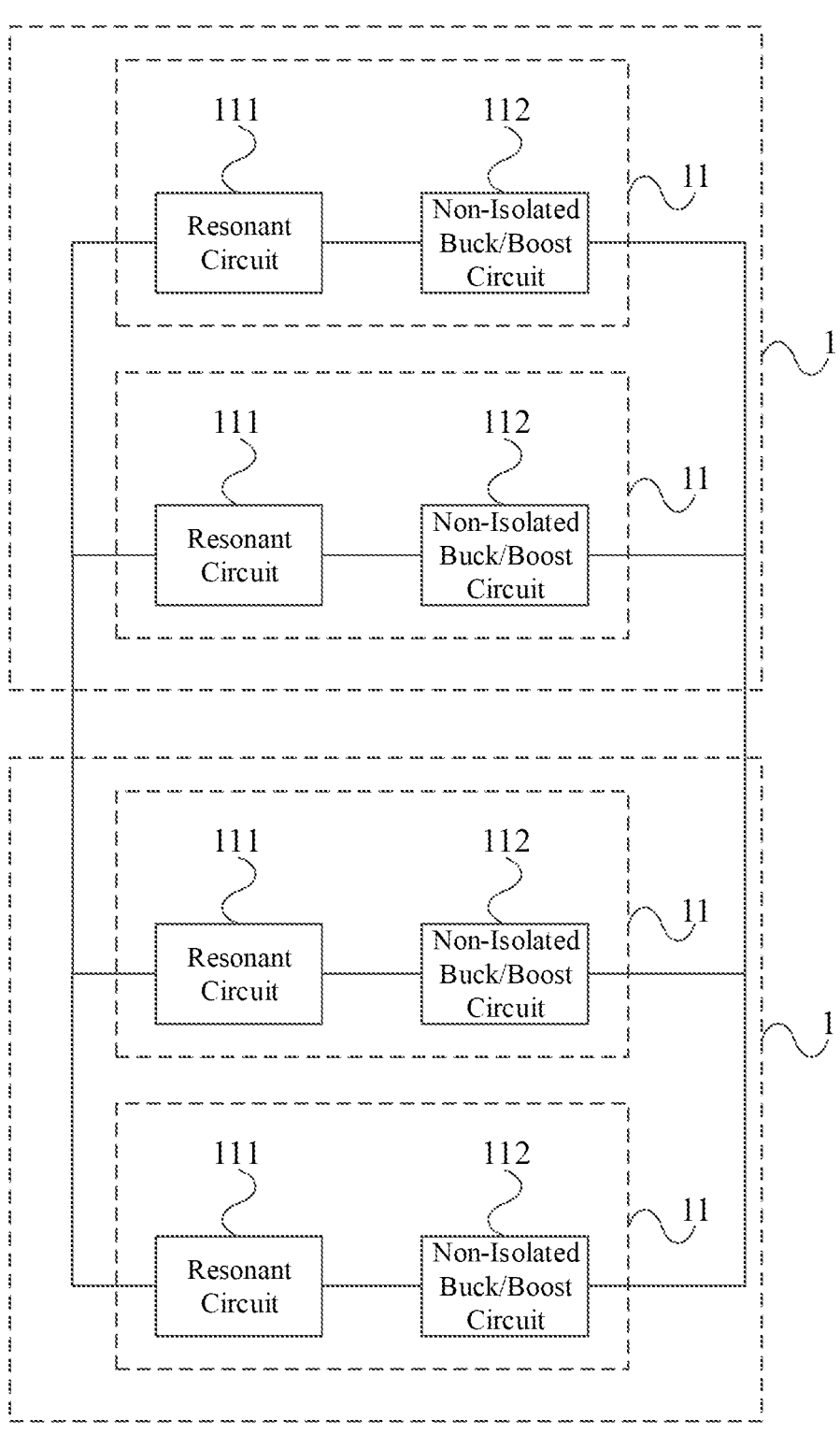
FIG. 2 is a structural diagram of a Direct Current to Direct Current (DCDC) converter according to a second embodiment of the present disclosure.

As illustrated in FIG. 2, the Direct Current to Direct Current (DCDC) converter according to the present disclosure includes two DCDC conversion modules 1 connected in parallel, which improves the power of the Direct Current to Direct Current (DCDC) converter compared with the structure including one DCDC conversion module 1 as illustrated in FIG. 1.

The Direct Current to Direct Current (DCDC) converter according to the embodiments of the present disclosure includes at least one DCDC conversion module and a controller, each of the DCDC conversion modules includes two bidirectional isolated DCDC units connected in parallel, each of the bidirectional isolated DCDC units includes a resonant circuit and a non-isolated buck/boost circuit connected in cascade, and the controller is electrically connected to each of the bidirectional isolated DCDC units and is configured to control current sharing among the non-isolated buck/boost circuits. The power requirement of the Direct Current to Direct Current (DCDC) converter is satisfied by at least one DCDC conversion module, thereby avoiding the use of complex transformer structure and reducing the manufacturing cost of the Direct Current to Direct Current (DCDC) converter.

Based on the above embodiments, further, the resonant circuit 111 includes a three-phase LLC circuit or an LLC extension circuit. An input and output ripple ratio of the three-phase LLC circuit is small. The LLC extension circuit is a three-phase resonant circuit modified or improved based on the above three-phase LLC circuit.

Figure 3:
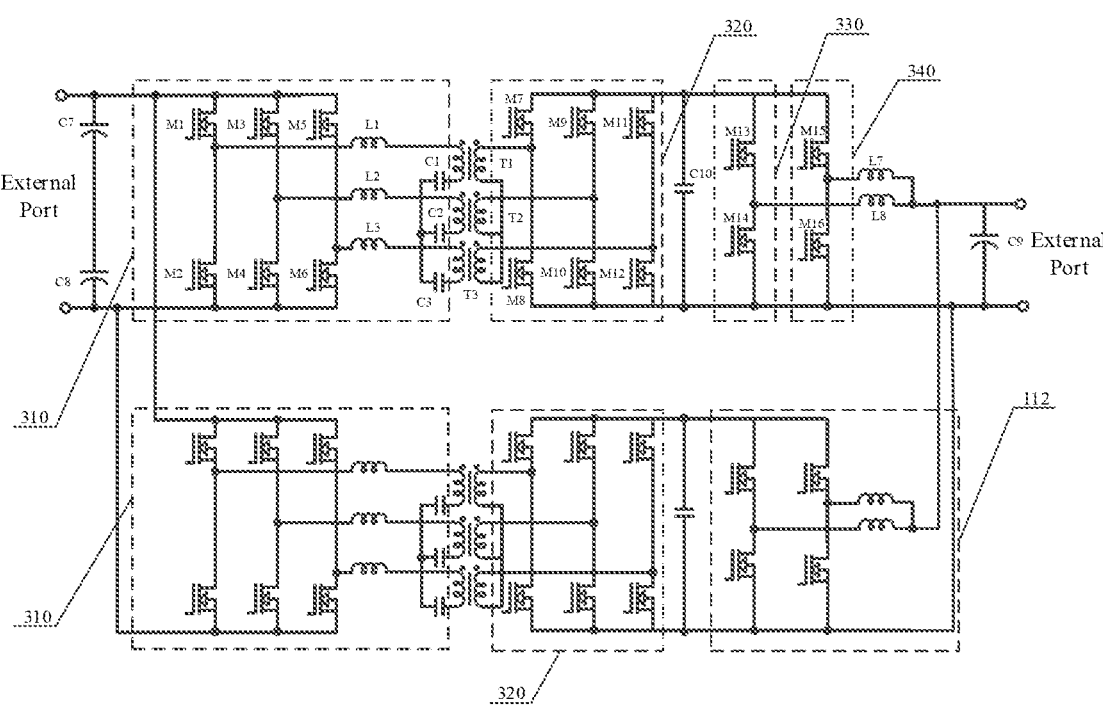
FIG. 3 is a structural diagram of a Direct Current to Direct Current (DCDC) converter according to a third embodiment of the present disclosure.

FIG. 3 is a structural diagram of a Direct Current to Direct Current (DCDC) converter according to a third embodiment of the present disclosure. As illustrated in FIG. 3, based on the above embodiments, further, the three-phase LLC circuit includes a first three-phase circuit 310, a second three-phase circuit 320 and three transformers, wherein:

The first three-phase circuit 310 is connected to primary sides of the three transformers, and the second three-phase circuit 320 is connected to secondary sides of the three transformers. The second three-phase circuit 320 is connected to the non-isolated buck/boost circuit 112.

The first three-phase circuit 310 may adopt the circuit structures illustrated in FIG. 3, 4, 5 or 6, or any other three-phase circuit in which electronic components such as inductor, capacitor, resistor, switch tube and the like are added or reduced based on the first three-phase circuit, which is not limited here. The second three-phase circuit 320 may adopt the circuit structures illustrated in FIG. 7, 8, 9 or 10, or any other three-phase circuit in which electronic components such as inductor, capacitor, resistor, switch tube and the like are added or reduced based on the second three-phase circuit, which is not limited here.

Figure 4:
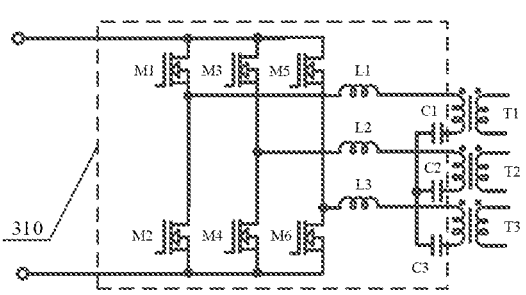
FIG. 4 is a structural diagram of a first three-phase circuit according to a fourth embodiment of the present disclosure.

FIG. 4 is a structural diagram of a first three-phase circuit according to a fourth embodiment of the present disclosure. As illustrated in FIG. 4, based on the above embodiments, further, the first three-phase circuit 310 includes a first switch tube M1, a second switch tube M2, a third switch tube M3, a fourth switch tube M4, a fifth switch tube M5, a sixth switch tube M6, a first inductor L1, a second inductor L2, a third inductor L3, a first capacitor C1, a second capacitor C2 and a third capacitor C3; the first switch tube M1 and the second switch tube M2 are connected in series, the third switch tube M3 and the fourth switch tube M4 are connected in series, and the fifth switch tube M5 and the sixth switch tube M6 are connected in series; a first end of the first inductor L1 is connected between the first switch tube M1 and the second switch tube M2, a first end of the second inductor L2 is connected between the third switch tube M3 and the fourth switch tube M4, and a first end of the third inductor L3 is connected between the fifth switch tube M5 and the sixth switch tube M6; a second end of the first inductor L1 is connected to a first end of a primary side of a first transformer T1, a second end of the primary side of the first transformer T1 is connected to a first end of the first capacitor C1, a second end of the second inductor L2 is connected to a first end of a primary side of a second transformer T2, a second end of the primary side of the second transformer T2 is connected to a first end of the second capacitor C2, a second end of the third inductor L3 is connected to a first end of a primary side of a third transformer T3, a second end of the primary side of the third transformer T3 is connected to a first end of the third capacitor C3, and a second end of the first capacitor C1 and a second end of the second capacitor C2 are connected to a second end of the third capacitor C3; a first end of the first switch tube M1 and a first end of the third switch tube M3 are connected to a first end of the fifth switch tube M5, and a second end of the second switch tube M2 and a second end of the fourth switch tube M4 are connected to a second end of the sixth switch tube M6.

Figure 5:
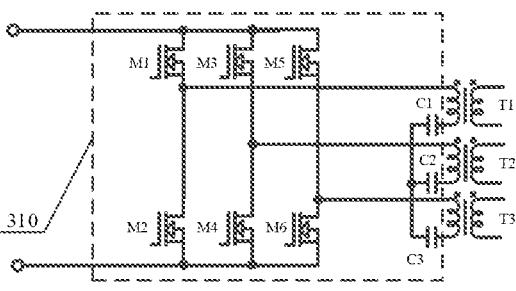
FIG. 5 is a structural diagram of a first three-phase circuit according to a fifth embodiment of the present disclosure.

FIG. 5 is a structural diagram of a first three-phase circuit according to a fifth embodiment of the present disclosure. As illustrated in FIG. 5, based on the above embodiments, further, the first three-phase 210 circuit includes a first switch tube M1, a second switch tube M2, a third switch tube M3, a fourth switch tube M4, a fifth switch tube M5, a sixth switch tube M6, a first capacitor C1, a second capacitor C2 and a third capacitor C3; the first switch tube M1 and the second switch tube M2 are connected in series, the third switch tube M3 and the fourth switch tube M4 are connected in series, and the fifth switch tube M5 and the sixth switch tube M6 are connected in series; a first end of a primary side of a first transformer T1 is connected between the first switch tube M1 and the second switch tube M2, a first end of a primary side of a second transformer T2 is connected between the third switch tube M3 and the fourth switch tube M4, and a first end of a primary side of a third transformer T3 is connected between the fifth switch tube M5 and the sixth switch tube M6; a second end of the primary side of the first transformer T1 is connected to a first end of the first capacitor C1, a second end of the primary side of the second transformer T2 is connected to a first end of the second capacitor C2, a second end of the primary side of the third transformer T3 is connected to a first end of the third capacitor C3, a second end of the first capacitor C1 and a second end of the second capacitor C2 are connected to a second end of the third capacitor C3.

Figure 6:
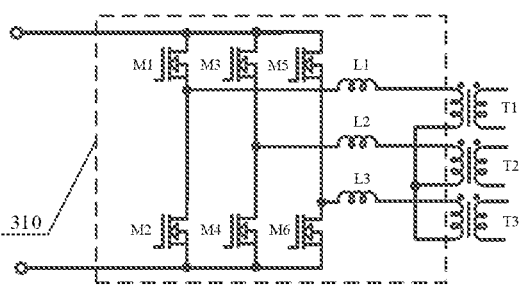
FIG. 6 is a structural diagram of a first three-phase circuit according to a sixth embodiment of the present disclosure.

FIG. 6 is a structural diagram of a first three-phase circuit according to a sixth embodiment of the present disclosure. As illustrated in FIG. 6, based on the above embodiments, further, the first three-phase circuit 310 includes a first switch tube M1, a second switch tube M2, a third switch tube M3, a fourth switch tube M4, a fifth switch tube M5, a sixth switch tube M6, a first inductor L1, a second inductor L2 and a third inductor L3; the first switch tube M1 and the second switch tube M2 are connected in series, the third switch tube M3 and the fourth switch tube M4 are connected in series, and the fifth switch tube M5 and the sixth switch tube M6 are connected in series; a first end of the first inductor L1 is connected between the first switch tube M1 and the second switch tube M2, a first end of the second inductor L2 is connected between the third switch tube M3 and the fourth switch tube M4, and a first end of the third inductor L3 is connected between the fifth switch tube M5 and the sixth switch tube M6; a second end of the first inductor L1 is connected to a first end of a primary side of a first transformer T1, a second end of the second inductor L2 is connected to a first end of a primary side of a second transformer T2, and a second end of the third inductor L3 is connected to a first end of a primary side of the third transformer T3; a second end of the primary side of the first transformer T1 and a second end of the primary side of the second transformer T2 are connected to a second end of the primary side of the third transformer T3.

Figure 7:
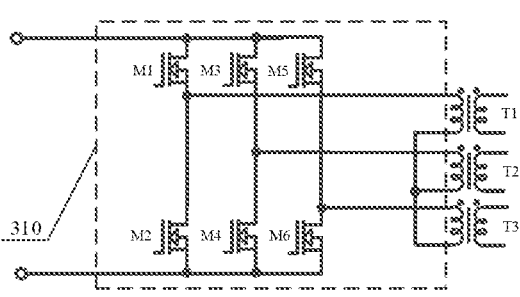
FIG. 7 is a structural diagram of a first three-phase circuit according to a seventh embodiment of the present disclosure.

FIG. 7 is a structural diagram of a first three-phase circuit according to a seventh embodiment of the present disclosure. As illustrated in FIG. 7, based on the above embodiments, further, the first three-phase circuit further includes a first switch tube M1, a second switch tube M2, a third switch tube M3, a fourth switch tube M4, a fifth switch tube M5 and a sixth switch tube M6; the first switch tube M1 and the second switch tube M2 are connected in series, the third switch tube M3 and the fourth switch tube M4 are connected in series, and the fifth switch tube M5 and the sixth switch tube M6 are connected in series; a first end of a primary side of the first transformer T1 is connected between the first switch tube M1 and the second switch tube M2, a first end of a primary side of the second transformer T2 is connected between the third switch tube M3 and the fourth switch tube M4, and a first end of a primary side of the third transformer T3 is connected between the fifth switch tube M5 and the sixth switch tube M6; a second end of the primary side of the first transformer T1 and a second end of the primary side of the second transformer T2 are connected to a second end of the primary side of the third transformer T3.

Figure 8:
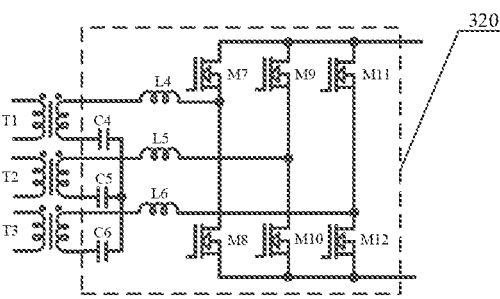
FIG. 8 is a structural diagram of a second three-phase circuit according to an eighth embodiment of the present disclosure.

FIG. 8 is a structural diagram of a second three-phase circuit according to an eighth embodiment of the present disclosure. As illustrated in FIG. 8, based on the above embodiments, further, the second three-phase circuit 320 includes a seventh switch tube M7, an eighth switch tube M8, a ninth switch tube M9, a tenth switch tube M10, an eleventh switch tube M11, a twelfth switch tube M12, a fourth inductor L4, a fifth inductor L5, a sixth inductor L6, a fourth capacitor C4, a fifth capacitor C5, and a sixth capacitor C6; the seventh switch tube M7 and the eighth switch tube M8 are connected in series, the ninth switch tube M9 and the tenth switch tube M10 are connected in series, and the eleventh switch tube M11 and the twelfth switch tube M12 are connected in series; a first end of a secondary side of a first transformer T1 is connected to a first end of the fourth inductor L4, and a second end of the fourth inductor L4 is connected between the seventh switch tube M7 and the eighth switch tube M8; a first end of a secondary side of a second transformer T2 is connected to a first end of the fifth inductor L5, and a second end of the fifth inductor L5 is connected between the ninth switch tube M9 and the tenth switch tube M10; a first end of a secondary side of a third transformer T3 is connected to a first end of the sixth inductor L6, and a second end of the sixth inductor L6 is connected between the eleventh switch tube M11 and the twelfth switch tube M12; a second end of the secondary side of the first transformer T1 is connected to a first end of the fourth capacitor C4, a second end of the secondary side of the second transformer T2 is connected to a first end of the fifth capacitor C5, a second end of the secondary side of the third transformer T3 is connected to a first end of the sixth capacitor C6, and a second end of the fourth capacitor C4 and a second end of the fifth capacitor C5 are connected to a second end of the sixth capacitor C6.

Figure 9:
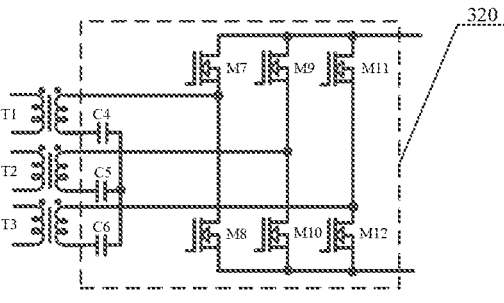
FIG. 9 is a structural diagram of a second three-phase circuit according to a ninth embodiment of the present disclosure.

FIG. 9 is a structural diagram of a second three-phase circuit according to a ninth embodiment of the present disclosure. As illustrated in FIG. 9, based on the above embodiments, further, the second three-phase circuit 320 includes a seventh switch tube M7, an eighth switch tube M8, a ninth switch tube M9, a tenth switch tube M10, an eleventh switch tube M11, a twelfth switch tube M12, a fourth capacitor C4, a fifth capacitor C5 and a sixth capacitor C6; the seventh switch tube M7 and the eighth switch tube M8 are connected in series, the ninth switch tube M9 and the tenth switch tube M10 are connected in series, and the eleventh switch tube M11 and the twelfth switch tube M12 are connected in series; a first end of a secondary side of a first transformer T1 is connected between the seventh switch tube M7 and the eighth switch tube M8; a first end of a secondary side of a second transformer T2 is connected between the ninth switch tube M9 and the tenth switch tube M10; a first end of a secondary side of a third transformer T3 is connected between the eleventh switch tube M11 and the twelfth switch tube M12; a second end of the secondary side of the first transformer T1 is connected to a first end of the fourth capacitor C4, a second end of the secondary side of the second transformer T2 is connected to a first end of the fifth capacitor C5, a second end of the secondary side of the third transformer T3 is connected to a first end of the sixth capacitor C6, and a second end of the fourth capacitor C4 and a second end of the fifth capacitor C5 are connected to a second end of the sixth capacitor C6.

Figure 10:
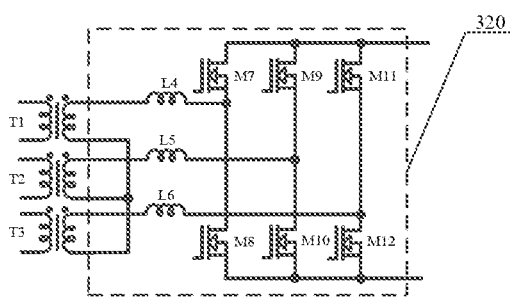
FIG. 10 is a structural diagram of a second three-phase circuit according to a tenth embodiment of the present disclosure.

FIG. 10 is a structural diagram of a second three-phase circuit according to a tenth embodiment of the present disclosure. As illustrated in FIG. 10, based on the above embodiments, further, the second three-phase circuit 320 includes a seventh switch tube M7, an eighth switch tube M8, a ninth switch tube M9, a tenth switch tube M10, an eleventh switch tube M11, a twelfth switch tube M12, a fourth inductor L4, a fifth inductor L5 and a sixth inductor L6; the seventh switch tube M7 and the eighth switch tube M8 are connected in series, the ninth switch tube M9 and the tenth switch tube M10 are connected in series, and the eleventh switch tube M11 and the twelfth switch tube M12 are connected in series; a first end of a secondary side of a first transformer T1 is connected to a first end of the fourth inductor L4, and a second end of the fourth inductor L4 is connected between the seventh switch tube M7 and the eighth switch tube M8; a first end of a secondary side of a second transformer T2 is connected to a first end of the fifth inductor L5, and a second end of the fifth inductor L5 is connected between the ninth switch tube M9 and the tenth switch tube M10; a first end of a secondary side of a third transformer T3 is connected to a first end of the sixth inductor L6, and a second end of the sixth inductor L6 is connected between the eleventh switch tube M11 and the twelfth switch tube M12; and a second end of the secondary side of the first transformer T1 and a second end of the secondary side of the second transformer T2 are connected to a second end of the secondary side of the third transformer T3.

Figure 11:
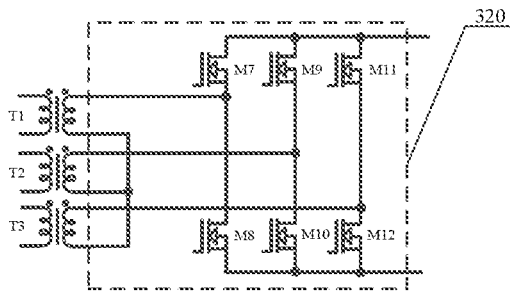
FIG. 11 is a structural diagram of a second three-phase circuit according to an eleventh embodiment of the present disclosure.

FIG. 11 is a structural diagram of a second three-phase circuit according to an eleventh embodiment of the present disclosure. As illustrated in FIG. 11, based on the above embodiments, further, the second three-phase circuit 320 includes a seventh switch tube M7, an eighth switch tube M8, a ninth switch tube M9, a tenth switch tube M10, an eleventh switch tube M11 and a twelfth switch tube M12; the seventh switch tube M7 and the eighth switch tube M8 are connected in series, the ninth switch tube M9 and the tenth switch tube M10 are connected in series, and the eleventh switch tube M11 and the twelfth switch tube M12 are connected in series; a first end of a secondary side of a first transformer T1 is connected between the seventh switch tube M7 and the eighth switch tube M8, a first end of a secondary side of a second transformer T2 is connected between the ninth switch tube M9 and the tenth switch tube M10, a first end of a secondary side of a third transformer T3 is connected between the eleventh switch tube M11 and the twelfth switch tube M12, and a second end of the secondary side of the first transformer T1 and a second end of the secondary side of the second transformer T2 are connected a second end of the secondary side of the third transformer T3.

Based on the above embodiments, further, the non-isolated buck/boost circuit 112 adopts an interleaving buck/boost circuit or a single-stage buck/boost circuit.

Figure 12:
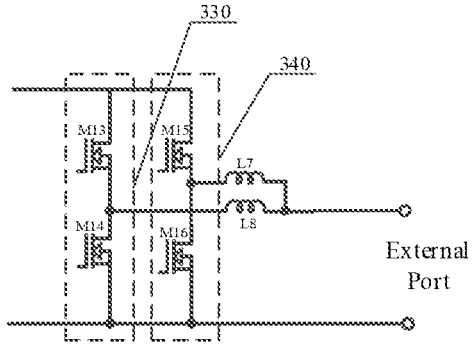
FIG. 12 is a structural diagram of a non-isolated buck/boost circuit according to a twelfth embodiment of the present disclosure.

Based on the above embodiments, further, as illustrated in FIG. 12, the non-isolated buck/boost circuit 112 includes a first branch 330, a second branch 340, a seventh inductor L7 and an eighth inductor L8, wherein:

the first branch 330 is connected in parallel with the second branch 340, the first branch 330 includes a thirteenth switch tube M13 and a fourteenth switch tube M14 connected in series, and the second branch 340 includes a fifteenth switch tube M15 and a sixteenth switch tube M16 connected in series; a first end of the seventh inductor L7 is connected to a second end of the fifteenth switch tube M15 and a first end of the sixteenth switch tube M16, a first end of the eighth inductor L8 is connected to a second end of the thirteenth switch tube M13 and a first end of the fourteenth switch tube M14, and a second end of the seventh inductor L7 is connected to a second end of the eighth inductor. The first branch 330 and the second branch 340 are connected to the resonant circuit 111, respectively.

As illustrated in FIG. 3, the first three-phase circuit 310 adopts the circuit structure illustrated in FIG. 3, the second three-phase circuit 320 adopts the circuit structure illustrated in FIG. 11, and the non-isolated buck/boost circuit 112 adopts the circuit structure illustrated in FIG. 12.

In which, an external port of the first three-phase circuit 310 may be provided with a first filter capacitor C7 and a second filter capacitor C8 connected in series, a first end of the first filter capacitor C7 is connected to a first end of the external port of the first three-phase circuit 310, a second end of the first filter capacitor C7 is connected to a first end of the second filter capacitor C8, and a second end of the second filter capacitor C8 is connected to a second end of the external port of the first three-phase circuit 310. A first end of the first switch tube M1, a first end of the third switch tube M3 and a first end of the fifth switch tube M5 are connected to the first end of the external port of the first three-phase circuit 310, and a second end of the second switch tube M2, a second end of the fourth switch tube M4 and a second end of the sixth switch tube M6 are connected to the second end of the external port of the first three-phase circuit 310.

The first switch tube M1 and the second switch tube M2 are driven complementarily, the third switch tube M3 and the fourth switch tube M4 are driven complementarily, and the fifth switch tube M5 and the sixth switch tube M6 are driven complementally; a first bridge arm to which the first switch tube M1 and the second switch tube M2 belong, a second bridge arm to which the third switch tube M3 and the fourth switch tube M4 belong and a third bridge arm to which the fifth switch tube M5 and the sixth switch tube M6 belong are driven at the same position by a difference of 120 degrees.

The seventh switch tube M7 and the eighth switch tube M8 are driven complementarily, the ninth switch tube M9 and the tenth switch tube M10 are driven complementarily, and the eleventh switch tube M11 and the twelfth switch tube M12 are driven complementarily; a fourth bridge arm to which the seventh switch tube M7 and the eighth switch tube M8 belong, a fifth bridge arm to which the ninth switch tube M9 and the tenth switch tube M10 belong and a sixth bridge arm to which the eleventh switch tube M11 and the twelfth switch tube M12 belong are driven at the same position by a difference of 120 degrees.

In which, an external port of the non-isolated buck/boost circuit 112 may be provided with a third filter capacitor C9, a first end of which is connected to a second end of the seventh inductor L7 and a second end of the eighth inductor L8, respectively, and a second end of which is connected to a second end of the fourteenth switch tube M14 and a second end of the sixteenth switch tube M16, respectively. A first end of the external port of the non-isolated buck/boost circuit 112 is connected to the first end of the third filter capacitor C9, the second end of the seventh inductor L7 and the second end of the eighth inductor L8, respectively. A second end of the external port of the non-isolated buck/boost circuit 112 is connected to the second end of the third filter capacitor C9, the second end of the fourteenth switch tube M14 and the second end of the sixteenth switch tube M16, respectively. The non-isolated buck/boost circuit 112 in FIG. 3 is an interleaving buck/boost circuit.

In which, a first bus capacitor C10 is disposed between the second three-phase circuit 320 and the non-isolated buck/boost circuit 112, and a voltage across the first bus capacitor may be referred to as an intermediate bus voltage, which is an output end voltage of the resonant circuit 111 during an operation in a first direction and an output end voltage of the non-isolated buck/boost circuit 112 during an operation in a second direction. The first bus capacitor C10 is connected in parallel with the second three-phase circuit 320; a first end of the first bus capacitor C10 is connected to the first end of the seventh switch tube M7, the first end of the ninth switch tube M9 and the first end of the eleventh switch tube M11, respectively, and a second end of the first bus capacitor C10 is connected to the second end of the eighth switch tube M8, the second end of the tenth switch tube M10 and the second end of the twelfth switch tube M12, respectively.

As illustrated in FIG. 13, the first three-phase circuit 310 adopts the circuit structure illustrated in FIG. 5, and the second three-phase circuit 320 adopts the circuit structure illustrated in FIG. 11.

The non-isolated buck/boost circuit 112 includes a seventeenth switch tube M17, an eighteenth switch tube M18 and a ninth inductor L9, wherein:

the seventeenth switch tube M17 and the eighteenth switch tube M18 are connected in series, a second end of the seventeenth switch tube M17 is connected to a first end of the eighteenth switch tube M18, and a first end of the ninth inductor L9 is connected to the second end of the seventeenth switch tube M17 and the first end of the eighteenth switch tube M18, respectively; a first end of the seventeenth switch tube M17 and a second end of the eighteenth switch tube M18 are connected to the second three-phase circuit 320.

The external port of the non-isolated buck/boost circuit 112 may be provided with a fourth filter capacitor C11, a first end of which is connected to a second end of the ninth inductor L9, and a second end of which is connected to the second end of the eighteenth switch tube M18. A first end of the external port of the non-isolated buck/boost circuit 112 is connected to the second end of the ninth inductor L9 and the first end of the fourth filter capacitor C11, respectively, and a second end of the external port of the non-isolated buck/boost circuit 112 is connected to the second end of the fourth filter capacitor C11 and the second end of the eighteenth switch tube M18, respectively. The non-isolated buck/boost circuit 112 in FIG. 13 is a single-stage buck/boost circuit.

As illustrated in FIG. 13, a second bus capacitor C12 is disposed between the second three-phase circuit 320 and the non-isolated buck/boost circuit 112, and a voltage across the second bus capacitor C12 may be referred to as an intermediate bus voltage. The second bus capacitor C12 and the second three-phase circuit 320 are connected in parallel, and a first ends of the second bus capacitor C12 are connected to the first end of the seventh switch tube M7, the first end of the ninth switch tube M9 and the first end of the eleventh switch tube M11, respectively. A second end of the second bus capacitor C12 is connected to the second end of the eighth switch tube M8, the second end of the tenth switch tube M10 and the second end of the twelfth switch tube M12, respectively.

A bidirectional charging and discharging device according to an embodiment of the present disclosure includes the Direct Current to Direct Current (DCDC) converter according to any one of the aforementioned embodiments. The bidirectional charging and discharging device may be applied to a charging pile.

FIG. 14 is a flowchart of a control method of a Direct Current to Direct Current (DCDC) converter according to a fourteenth embodiment of the present disclosure. As illustrated in FIG. 14, the control method of the Direct Current to Direct Current (DCDC) converter according to the embodiment of the present disclosure may be applied to the Direct Current to Direct Current (DCDC) converter according to any one of the aforementioned embodiments, including:

S1401: during an operation in a first direction, controlling driving of the two resonant circuits included in each of the DCDC conversion modules at corresponding positions to be opposite, and controlling each of the non-isolated buck/boost circuits to work in a buck state and causing output current of each of the non-isolated buck/boost circuits to be equal.

Specifically, when the Direct Current to Direct Current (DCDC) converter works in a charging mode, i.e., operating in the first direction, current flows from each of the resonant circuits to the cascaded non-isolated buck/boost circuit, and the controller drives each of the resonant circuits to buck an input voltage to obtain an intermediate bus voltage, while controlling driving of the two resonant circuits included in each of the DCDC conversion modules at corresponding positions to be opposite, so as to reduce EMI noise of the Direct Current to Direct Current (DCDC) converter. The controller drives each of the non-isolated buck/boost circuits to work in a buck state, and buck and output the intermediate bus voltage, while controlling output current of each of the non-isolated buck/boost circuits to be equal, so as to achieve the current sharing among the non-isolated buck/boost circuits.

S1402: during an operation in a second direction, controlling driving of the two resonant circuits included in each of the DCDC conversion modules at corresponding positions to be opposite, and controlling each of the non-isolated buck/boost circuits to work in a DC boost state and causing output current of each of the non-isolated buck/boost circuits to be equal, wherein the first direction is opposite to the second direction.

Specifically, when the Direct Current to Direct Current (DCDC) converter works in a power supply mode, i.e., operating in the second direction, current flows from each of the non-isolated buck/boost circuits to the cascaded resonant circuit, and the controller drives each of the non-isolated buck/boost circuits to work in a buck state, converts a voltage input from an input end into an intermediate bus voltage, while controlling the output current of each of the non-isolated buck/boost circuits to be equal, so as to achieve the current sharing among the non-isolated buck/boost circuits. The controller drives each of the resonant circuits to buck and output the intermediate bus voltage, while controlling driving of the two resonant circuits included in each of the DCDC conversion modules at corresponding positions to be opposite, so as to reduce EMI noise of the DC-DC DCDC converter, wherein the first direction is opposite to the second direction. It can be understood that there is no sequential relationship between step S401 and step S402.

The control method of the Direct Current to Direct Current (DCDC) converter according to the embodiment of the present disclosure, during an operation in a first direction, controls driving of the two resonant circuits included in each of the DCDC conversion modules at corresponding positions to be opposite, and controls each of the non-isolated buck/boost circuits to work in a buck state while causing output current of each of the non-isolated buck/boost circuits to be equal; and during an operation in a second direction, controls driving of the two resonant circuits included in each of the DCDC conversion modules at corresponding positions to be opposite, and controls each of the non-isolated buck/boost circuits to work in a DC boost state while causing output current of each of the non-isolated buck/boost circuits to be equal, so as to achieve the current sharing among the non-isolated buck/boost circuits, reduce the capacitance ripples between the resonant circuit and the non-isolated buck/boost circuit, and improve the reliability of the Direct Current to Direct Current (DCDC) converter.

Based on the above embodiments, further, controlling each of the non-isolated buck/boost circuits to work in a buck state and causing output current of each of the non-isolated buck/boost circuits to be equal includes:

generating a first current reference value according to a preset voltage reference value and an output voltage sampling value, and adjusting a duty ratio of each of the non-isolated buck/boost circuits according to the first current reference value and the output current sampling value of each of the non-isolated buck/boost circuits, so as to cause the output current of each of the non-isolated buck/boost circuits to be equal.

Specifically, during the operation in the first direction, an output voltage at the output end of the Direct Current to Direct Current (DCDC) converter is sampled to obtain an output voltage sampling value, and the controller compares a preset voltage reference value with the output voltage sampling value to generate a first current reference value. The output current of each of the non-isolated buck/boost circuits is sampled to obtain the output current sampling value of each of the non-isolated buck/boost circuits, and the controller takes the first current reference value as a common current reference for the non-isolated buck/boost circuits, and adjusts a duty ratio of each of the non-isolated buck/boost circuits by comparing the first current reference value with the output current sampling value of each of the non-isolated buck/boost circuits to cause the output current of each of the non-isolated buck/boost circuits to be equal. In which, the preset voltage reference value is set according to actual needs, and is not limited in the embodiments of the present disclosure.

Figure 15:
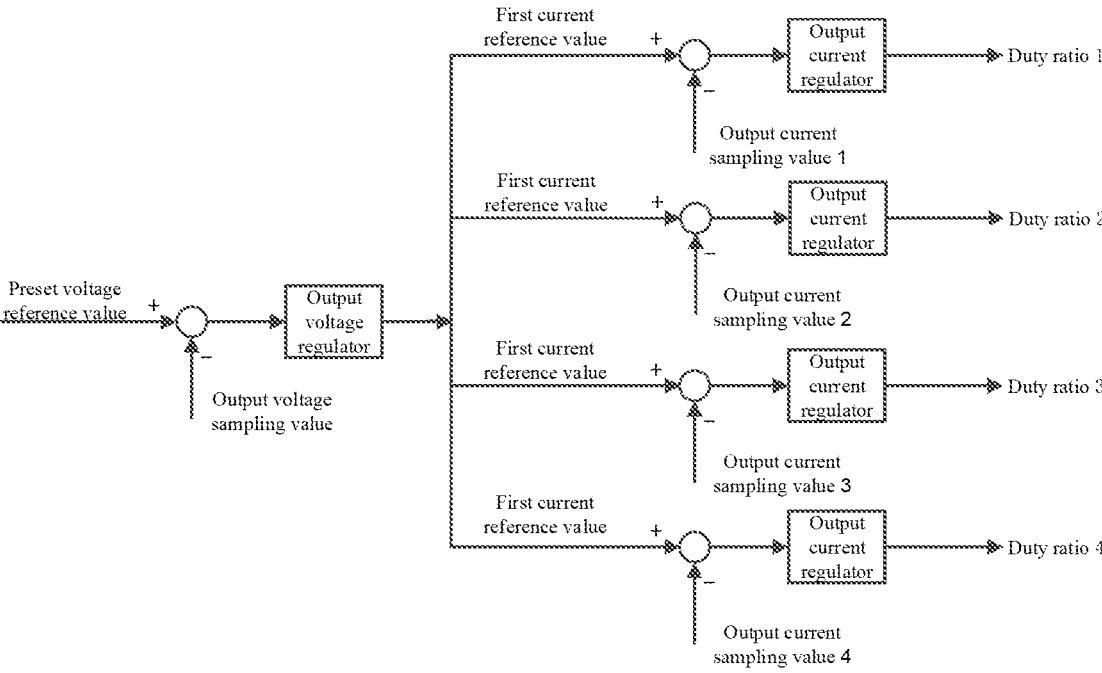
FIG. 15 is a control diagram of an operation in a first direction according to a fifteenth embodiment of the present disclosure.

For example, FIG. 15 is a control diagram of an operation in a first direction according to a fifteenth embodiment of the present disclosure. As illustrated in FIG. 15, a preset voltage reference value is compared with an output voltage sampling value, and according to a comparison result thereof, an output voltage regulator generates a first current reference value. By regulating the output current of each of the non-isolated buck/boost circuits according to the comparison result of the first current reference value and the output current sampling value of each of the non-isolated buck/boost circuits, the duty ratio of each of the non-isolated buck/boost circuits is adjusted, so as to regulate the output current of each of the non-isolated buck/boost circuits, thereby causing the output current of each of the non-isolated buck/boost circuits to be equal.

Based on the above embodiments, further, controlling each of the non-isolated buck/boost circuits to work in a DC boost state and causing output current of each of the non-isolated buck/boost circuits to be equal includes:

controlling each of the non-isolated buck/boost circuits to generate an intermediate bus voltage of each of the bidirectional isolated DCDC units, and obtaining a second current reference value according to an intermediate bus voltage reference value and an intermediate bus voltage sampling value of each of the bidirectional isolated DCDC units;

adjusting a duty ratio of each of the non-isolated buck/boost circuits according to the second current reference value and an input current sampling value of each of the non-isolated buck/boost circuits, so as to cause input current of each of the non-isolated buck/boost circuits to be equal.

Specifically, during an operation in a second direction, the controller controls each of the non-isolated buck/boost circuits to boost an external input voltage to generate an intermediate bus voltage of each of the bidirectional isolated DCDC units, i.e., an output voltage of each of the bidirectional isolated DCDC units. An intermediate bus voltage sampling value of each of the bidirectional isolated DCDC units may be obtained by sampling the intermediate bus voltage of each of the bidirectional isolated DCDC units, and the controller may calculate an average value of the intermediate bus voltage sampling values of the bidirectional isolated DCDC units and take the calculated average value as an intermediate bus voltage comparison value, or acquire a maximum value of the intermediate bus voltage sampling values of the bidirectional isolated DCDC units as the intermediate bus voltage comparison value. The controller compares an intermediate bus voltage reference value with the intermediate bus voltage comparison value to generate a second current reference value as a common current reference for the non-isolated buck/boost circuits.

An input current sampling value of each of the non-isolated buck/boost circuits may be obtained by sampling the input current of each of the non-isolated buck/boost circuits. The controller adjusts a duty ratio of each of the non-isolated buck/boost circuits by comparing the second current reference value with the input current sampling value of each of the non-isolated buck/boost circuits, so as to cause the output current of each of the non-isolated buck/boost circuits to be equal. In which, the intermediate bus voltage reference value is set according to actual needs and is not limited in the embodiments of the present disclosure.

Figure 16:
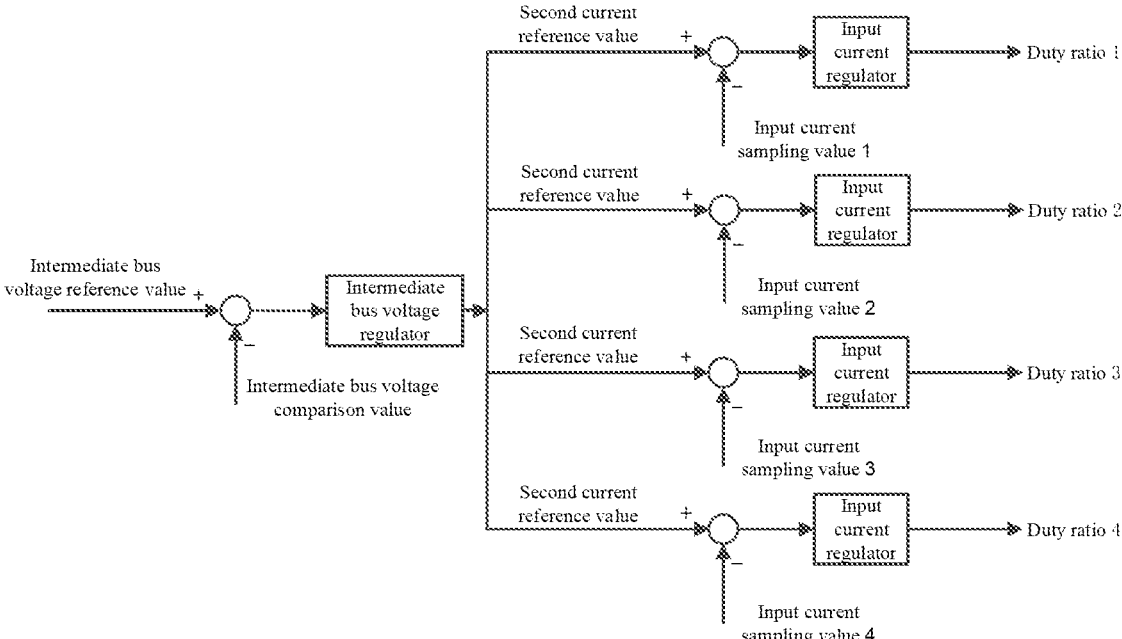
FIG. 16 is a control diagram of an operation in a second direction according to a sixteenth embodiment of the present disclosure.

For example, FIG. 16 is a control diagram of an operation in a second direction according to a sixteenth embodiment of the present disclosure. As illustrated in FIG. 16, an intermediate bus voltage sampling value of each of the bidirectional isolated DCDC units is obtained, and then an average value is calculated to obtain an intermediate bus voltage comparison value. Next, an intermediate bus voltage reference value is compared with the intermediate bus voltage comparison value, and according to a comparison result thereof, an intermediate bus voltage regulator generates a second current reference value. By regulating the input current of each of the non-isolated buck/boost circuits according to the comparison result of the second current reference value and the input current sampling value of each of the non-isolated buck/boost circuits, the duty ratio of each of the non-isolated buck/boost circuits is adjusted, so as to regulate the output current of each of the non-isolated buck/boost circuits, thereby causing the output current of each of the non-isolated buck/boost circuits to be equal.

In the present disclosure, descriptions referring to the terms such as 'an embodiment', 'a specific embodiment', 'some embodiments', 'for example', 'an example', 'a specific example' or 'some examples' mean that the specific features, structures, materials or characteristics described in connection with the embodiment(s) or example(s) are included in at least one embodiment or example of the present disclosure. In the present disclosure, the schematic expressions of the above terms do not necessarily refer to a same embodiment or example. Further, the specific features, structures, materials or characteristics described may be combined in any one or more embodiments or examples in a suitable manner.

When a circuit or electronic component is referred to as being 'connected to' or 'accessing' another circuit or electronic component, it should be understood that the circuit or electronic component may be directly connected to or access another circuit or electronic component, or there may be still another circuit or electronic component therebetween.

The above specific embodiments further explain the objectives, technical solutions and advantageous effects of the present disclosure in detail. It should be understood that those described above are only specific embodiments of the present disclosure, and are not intended to limit the protection scope of the present disclosure. Any modification, equivalent substitution, improvement, etc. made within the spirit and principle of the present disclosure should fall within the protection scope of the present disclosure.

The invention claimed is:

1. A Direct Current to Direct Current (DCDC) converter, comprising a plurality of DCDC conversion modules and a controller, wherein:

each of the DCDC conversion modules comprises two bidirectional isolated DCDC units connected in parallel, each of the two bidirectional isolated DCDC units comprises a resonant circuit and a non-isolated buck/boost circuit connected in cascade; wherein a frequency of each of the resonant circuits is fixed for achieving voltage isolation of each resonant circuit; and the plurality of DCDC conversion modules are connected in parallel for improving power efficiency of the Direct Current to Direct Current converter;

the controller is electrically connected to each of the two bidirectional isolated DCDC units, and is configured to control current sharing among each of the non-isolated buck/boost circuits;

wherein each resonant circuit comprises an LLC extension circuit;

wherein the LLC extension circuit comprises a first three-phase circuit, a second three-phase circuit and three transformers, wherein:

the first three-phase circuit is connected to primary sides of the three transformers, and the second three-phase circuit is connected to secondary sides of the three transformers;

wherein each non-isolated buck/boost circuit adopts an interleaving buck/boost circuit;

wherein each non-isolated buck/boost circuit comprises a first branch, a second branch, a seventh inductor and an eighth inductor, wherein:

the first branch and the second branch are connected in parallel, the first branch comprises a thirteenth switch tube and a fourteenth switch tube connected in series, and the second branch comprises a fifteenth switch tube and a sixteenth switch tube connected in series: a first end of the seventh inductor is connected to a second end of the fifteenth switch tube and a first end of the sixteenth switch tube, a first end of the eighth inductor is connected to a second end of the thirteenth switch tube and a first end of the fourteenth switch tube, and a second end of the seventh inductor is connected to a second end of the eighth inductor.

2. The Direct Current to Direct Current (DCDC) converter according to claim 1, wherein the first three-phase circuit comprises a first switch tube, a second switch tube, a third switch tube, a fourth switch tube, a fifth switch tube, a sixth switch tube, a first inductor, a second inductor, a third inductor, a first capacitor, a second capacitor and a third capacitor; the first switch tube and the second switch tube are connected in series, the third switch tube and the fourth switch tube are connected in series, and the fifth switch tube and the sixth switch tube are connected in series; a first end of the first inductor is connected between the first switch tube and the second switch tube, a first end of the second inductor is connected between the third switch tube and the fourth switch tube, and a first end of the third inductor is connected between the fifth switch tube and the sixth switch tube; a second end of the first inductor is connected to a first end of a primary side of a first transformer of the three transformers, a second end of the primary side of the first transformer is connected to a first end of the first capacitor, a second end of the second inductor is connected to a first end of a primary side of a second transformer of the three transformers, a second end of the primary side of the second transformer is connected to a first end of the second capacitor, a second end of the third inductor is connected to a first end of a primary side of a third transformer of the three transformers, a second end of the primary side of the third transformer is connected to a first end of the third capacitor, and a second end of the first capacitor and a second end of the second capacitor are connected to a second end of the third capacitor; or the first three-phase circuit comprises a first switch tube, a second switch tube, a third switch tube, a fourth switch tube, a fifth switch tube, a sixth switch tube, a first capacitor, a second capacitor and a third capacitor; the first switch tube and the second switch tube are connected in series, the third switch tube and the fourth switch tube are connected in series, and the fifth switch tube and the sixth switch tube are connected in series; a first end of a primary side of a first transformer of the three transformers is connected between the first switch tube and the second switch tube, a first end of a primary side of a second transformer of the three transformers is connected between the third switch tube and the fourth switch tube, and a first end of a primary side of a third transformer of the three transformers is connected between the fifth switch tube and the sixth switch tube; a second end of the primary side of the first transformer is connected to a first end of the first capacitor, a second end of the primary side of the second transformer is connected to a first end of the second capacitor, a second end of the primary side of the third transformer is connected to a first end of the third capacitor, and a second end of the first capacitor and a second end of the second capacitor are connected to a second end of the third capacitor; or the first three-phase circuit comprises a first switch tube, a second switch tube, a third switch tube, a fourth switch tube, a fifth switch tube, a sixth switch tube, a first inductor, a second inductor and a third inductor; the first switch tube and the second switch tube are connected in series, the third switch tube and the fourth switch tube are connected in series, and the fifth switch tube and the sixth switch tube are connected in series; a first end of the first inductor is connected between the first switch tube and the second switch tube, a first end of the second inductor is connected between the third switch tube and the fourth switch tube, and a first end of the third inductor is connected between the fifth switch tube and the sixth switch tube; a second end of the first inductor is connected to a first end of a primary side of a first transformer of the three transformers, a second end of the second inductor is connected to a first end of a primary side of a second transformer of the three transformers, and a second end of the third inductor is connected to a first end of a primary side of a third transformer of the three transformers; a second end of the primary side of the first transformer and a second end of the primary side of the second transformer are connected to a second end of the primary side of the third transformer; or, the first three-phase circuit comprises a first switch tube, a second switch tube, a third switch tube, a fourth switch tube, a fifth switch tube and a sixth switch tube; the first switch tube and the second switch tube are connected in series, the third switch tube and the fourth switch tube are connected in series, and the fifth switch tube and the sixth switch tube are connected in series; a first end of a primary side of a first transformer of the three transformers is connected between the first switch tube and the second switch tube, a first end of a primary side of a second transformer of the three transformers is connected between the third switch tube and the fourth switch tube, and a first end of a primary side of a third transformer of the three transformers is connected between the fifth switch tube and the sixth switch tube; a second end of the primary side of the first transformer and a second end of the primary side of the second transformer are connected to a second end of the primary side of the third transformer.

3. The Direct Current to Direct Current (DCDC) converter according to claim 1, wherein the second three-phase circuit comprises a seventh switch tube, an eighth switch tube, a ninth switch tube, a tenth switch tube, an eleventh switch tube, a twelfth switch tube, a fourth inductor, a fifth inductor, a sixth inductor, a fourth capacitor, a fifth capacitor and a sixth capacitor; the seventh switch tube and the eighth switch tube are connected in series, the ninth switch tube and the tenth switch tube are connected in series, and the eleventh switch tube and the twelfth switch tube are connected in series; a first end of a secondary side of a first transformer of the three transformers is connected to a first end of the fourth inductor, and a second end of the fourth inductor is connected between the seventh switch tube and the eighth switch tube; a first end of a secondary side of a second transformer of the three transformers is connected to a first end of the fifth inductor, and a second end of the fifth inductor is connected between the ninth switch tube and the tenth switch tube; a first end of a secondary side of a third transformer of the three transformers is connected to a first end of the sixth inductor, and a second end of the sixth inductor is connected between the eleventh switch tube and the twelfth switch tube; a second end of the secondary side of the first transformer is connected to a first end of the fourth capacitor, a second end of the secondary side of the fifth second transformer is connected to a first end of the fifth capacitor, a second end of the secondary side of the third transformer is connected to a first end of the sixth capacitor, and a second end of the fourth capacitor and a second end of the fifth capacitor are connected to a second end of the sixth capacitor; or the second three-phase circuit comprises a seventh switch tube, an eighth switch tube, a ninth switch tube, a tenth switch tube, an eleventh switch tube, a twelfth switch tube, a fourth capacitor, a fifth capacitor and a sixth capacitor; the seventh switch tube and the eighth switch tube are connected in series, the ninth switch tube and the tenth switch tube are connected in series, and the eleventh switch tube and the twelfth switch tube are connected in series; a first end of a secondary side of a first transformer of the three transformers is connected between the seventh switch tube and the eighth switch tube; a first end of a secondary side of a second transformer of the three transformers is connected between the ninth switch tube and the tenth switch tube; a first end of a secondary side of a third transformer of the three transformers is connected between the eleventh switch tube and the twelfth switch tube; a second end of the secondary side of the first transformer is connected to a first end of the fourth capacitor, a second end of the secondary side of the second transformer is connected to a first end of the fifth capacitor, a second end of the secondary side of the third transformer is connected to a first end of the sixth capacitor, and a second end of the fourth capacitor and a second end of the fifth capacitor are connected to a second end of the sixth capacitor; or the second three-phase circuit comprises a seventh switch tube, an eighth switch tube, a ninth switch tube, a tenth switch tube, an eleventh switch tube, a twelfth switch tube, a fourth inductor, a fifth inductor and a sixth inductor; the seventh switch tube and the eighth switch tube are connected in series, the ninth switch tube and the tenth switch tube are connected in series, and the eleventh switch tube and the twelfth switch tube are connected in series; a first end of a secondary side of a first transformer of the three transformers is connected to a first end of the fourth inductor, and a second end of the fourth inductor is connected between the seventh switch tube and the eighth switch tube; a first end of a secondary side of a second transformer of the three transformers is connected to a first end of the fifth inductor, and a second end of the fifth inductor is connected between the ninth switch tube and the tenth switch tube; a first end of a secondary side of a third transformer of the three transformers is connected to a first end of the sixth inductor, and a second end of the sixth inductor is connected between the eleventh switch tube and the twelfth switch tube; a second end of the secondary side of the first transformer and a second end of the secondary side of the second transformer are connected to a second end of the secondary side of the third transformer; or, the second three-phase circuit comprises a seventh switch tube, an eighth switch tube, a ninth switch tube, a tenth switch tube, an eleventh switch tube and a twelfth switch tube; the seventh switch tube and the eighth switch tube are connected in series, the ninth switch tube and the tenth switch tube are connected in series, and the eleventh switch tube and the twelfth switch tube are connected in series; a first end of a secondary side of a first transformer of the three transformers is connected between the seventh switch tube and the eighth switch tube, a first end of a secondary side of a second transformer of the three transformers is connected between the ninth switch tube and the tenth switch tube, a first end of a secondary side of a third transformer of the three transformers is connected between the eleventh switch tube and the twelfth switch tube, and a second end of the secondary side of the first transformer and a second end of the secondary side of the second transformer are connected to a second end of the secondary side of the third transformer.

4. A control method of the Direct Current to Direct Current (DCDC)-converter according to claim 1, comprising:

during an operation in a first direction, controlling driving of two resonant circuits comprised in each of the DCDC conversion modules at corresponding positions to be opposite, and controlling the non-isolated buck/boost circuit included in each of the two bidirectional isolated DCDC units to work in a buck state and causing output current of the respective non-isolated buck/boost circuits to be equal; and during an operation in a second direction, controlling driving of two resonant circuits comprised in each of the DCDC conversion modules at corresponding positions to be opposite, and controlling the non-isolated buck/boost circuit included in each of the two bidirectional isolated DCDC units to work in a DC boost state and causing output current of the respective non-isolated buck/boost circuits to be equal, wherein the first direction is opposite to the second direction.

5. The method according to claim 4, wherein controlling the non-isolated buck/boost circuit included in each of the two bidirectional isolated DCDC units to work in the buck state and causing output current of the respective non-isolated buck/boost circuits to be equal comprises:

generating a first current reference value according to a preset voltage reference value and an output voltage sampling value, and adjusting a duty ratio of the non-isolated buck/boost circuit included in each of the two bidirectional isolated DCDC units according to the first current reference value and an output current sampling value of the respective non-isolated buck/boost circuits, so as to cause the output current of each of the non-isolated buck/boost circuits to be equal.

6. The method according to claim 4, wherein controlling the non-isolated buck/boost circuits included in each of the two bidirectional isolated DCDC units to work in the DC boost state and causing output current of the respective non-isolated buck/boost circuits to be equal comprises:

controlling the non-isolated buck/boost circuit included in each of the two bidirectional isolated DCDC units to generate an intermediate bus voltage of each of the bidirectional isolated DCDC units, and obtaining a second current reference value according to an intermediate bus voltage reference value and an intermediate bus voltage sampling value of each of the two bidirectional isolated DCDC units; and adjusting a duty ratio of the non-isolated buck/boost circuit included in each of the two bidirectional isolated DCDC units according to the second current reference value and an input current sampling value of the non-isolated buck/boost circuit included in each of the two bidirectional isolated DCDC units, so as to cause input current of the respective non-isolated buck/boost circuits to be equal.

7. A bidirectional charging and discharging device, comprising a Direct Current to Direct Current (DCDC) converter, wherein:

the Direct Current to Direct Current (DCDC) converter comprises a plurality of DCDC conversion modules and a controller;

each of the DCDC conversion modules comprises two bidirectional isolated DCDC units connected in parallel, each of the two bidirectional isolated DCDC units comprises a resonant circuit and a non-isolated buck/boost circuit connected in cascade; wherein a frequency of each of the resonant circuits is fixed for achieving voltage isolation of each resonant circuit; and the plurality of DCDC conversion modules are connected in parallel for improving power efficiency of the Direct Current to Direct Current converter;

the controller is electrically connected to each of the two bidirectional isolated DCDC units, and is configured to control current sharing among the non-isolated buck/boost circuits;

wherein each resonant circuit comprises an LLC extension circuit;

wherein the LLC extension circuit comprises a first three-phase circuit, a second three-phase circuit and three transformers, wherein:

the first three-phase circuit is connected to primary sides of the three transformers, and the second three-phase circuit is connected to secondary sides of the three transformers:

wherein each non-isolated buck/boost circuit adopts an interleaving buck/boost circuit;

wherein each non-isolated buck/boost circuit comprises a first branch, a second branch, a seventh inductor and an eighth inductor, wherein:

the first branch and the second branch are connected in parallel, the first branch comprises a thirteenth switch tube and a fourteenth switch tube connected in series, and the second branch comprises a fifteenth switch tube and a sixteenth switch tube connected in series; a first end of the seventh inductor is connected to a second end of the fifteenth switch tube and a first end of the sixteenth switch tube, a first end of the eighth inductor is connected to a second end of the thirteenth switch tube and a first end of the fourteenth switch tube, and a second end of the seventh inductor is connected to a second end of the eighth inductor.

8. The bidirectional charging and discharging device, according to claim 7, wherein the first three-phase circuit comprises a first switch tube, a second switch tube, a third switch tube, a fourth switch tube, a fifth switch tube, a sixth switch tube, a first inductor, a second inductor, a third inductor, a first capacitor, a second capacitor and a third capacitor; the first switch tube and the second switch tube are connected in series, the third switch tube and the fourth switch tube are connected in series, and the fifth switch tube and the sixth switch tube are connected in series; a first end of the first inductor is connected between the first switch tube and the second switch tube, a first end of the second inductor is connected between the third switch tube and the fourth switch tube, and a first end of the third inductor is connected between the fifth switch tube and the sixth switch tube; a second end of the first inductor is connected to a first end of a primary side of a first transformer of the three transformers, a second end of the primary side of the first transformer is connected to a first end of the first capacitor, a second end of the second inductor is connected to a first end of a primary side of a second transformer of the three transformers, a second end of the primary side of the second transformer is connected to a first end of the second capacitor, a second end of the third inductor is connected to a first end of a primary side of a third transformer of the three transformers, a second end of the primary side of the third transformer is connected to a first end of the third capacitor, and a second end of the first capacitor and a second end of the second capacitor are connected to a second end of the third capacitor; or the first three-phase circuit comprises a first switch tube, a second switch tube, a third switch tube, a fourth switch tube, a fifth switch tube, a sixth switch tube, a first capacitor, a second capacitor and a third capacitor; the first switch tube and the second switch tube are connected in series, the third switch tube and the fourth switch tube are connected in series, and the fifth switch tube and the sixth switch tube are connected in series; a first end of a primary side of a first transformer of the three transformers is connected between the first switch tube and the second switch tube, a first end of a primary side of a second transformer of the three transformers is connected between the third switch tube and the fourth switch tube, and a first end of a primary side of a third transformer of the three transformers is connected between the fifth switch tube and the sixth switch tube; a second end of the primary side of the first transformer is connected to a first end of the first capacitor, a second end of the primary side of the second transformer is connected to a first end of the second capacitor, a second end of the primary side of the third transformer is connected to a first end of the third capacitor, and a second end of the first capacitor and a second end of the second capacitor are connected to a second end of the third capacitor; or the first three-phase circuit comprises a first switch tube, a second switch tube, a third switch tube, a fourth switch tube, a fifth switch tube, a sixth switch tube, a first inductor, a second inductor and a third inductor; the first switch tube and the second switch tube are connected in series, the third switch tube and the fourth switch tube are connected in series, and the fifth switch tube and the sixth switch tube are connected in series; a first end of the first inductor is connected between the first switch tube and the second switch tube, a first end of the second inductor is connected between the third switch tube and the fourth switch tube, and a first end of the third inductor is connected between the fifth switch tube and the sixth switch tube; a second end of the first inductor is connected to a first end of a primary side of a first transformer of the three transformers, a second end of the second inductor is connected to a first end of a primary side of a second transformer of the three transformers, and a second end of the third inductor is connected to a first end of a primary side of a third transformer of the three transformers; a second end of the primary side of the first transformer and a second end of the primary side of the second transformer are connected to a second end of the primary side of the third transformer; or, the first three-phase circuit comprises a first switch tube, a second switch tube, a third switch tube, a fourth switch tube, a fifth switch tube and a sixth switch tube; the first switch tube and the second switch tube are connected in series, the third switch tube and the fourth switch tube are connected in series, and the fifth switch tube and the sixth switch tube are connected in series; a first end of a primary side of a first transformer of the three transformers is connected between the first switch tube and the second switch tube, a first end of a primary side of a second transformer of the three transformers is connected between the third switch tube and the fourth switch tube, and a first end of a primary side of a third transformer of the three transformers is connected between the fifth switch tube and the sixth switch tube; a second end of the primary side of the first transformer and a second end of the primary side of the second transformer are connected to a second end of the primary side of the third transformer.

9. The bidirectional charging and discharging device, according to claim 7, wherein the second three-phase circuit comprises a seventh switch tube, an eighth switch tube, a ninth switch tube, a tenth switch tube, an eleventh switch tube, a twelfth switch tube, a fourth inductor, a fifth inductor, a sixth inductor, a fourth capacitor, a fifth capacitor and a sixth capacitor; the seventh switch tube and the eighth switch tube are connected in series, the ninth switch tube and the tenth switch tube are connected in series, and the eleventh switch tube and the twelfth switch tube are connected in series; a first end of a secondary side of a first transformer of the three transformers is connected to a first end of the fourth inductor, and a second end of the fourth inductor is connected between the seventh switch tube and the eighth switch tube; a first end of a secondary side of a second transformer of the three transformers is connected to a first end of the fifth inductor, and a second end of the fifth inductor is connected between the ninth switch tube and the tenth switch tube; a first end of a secondary side of a third transformer of the three transformers is connected to a first end of the sixth inductor, and a second end of the sixth inductor is connected between the eleventh switch tube and the twelfth switch tube; a second end of the secondary side of the first transformer is connected to a first end of the fourth capacitor, a second end of the secondary side of the second transformer is connected to a first end of the fifth capacitor, a second end of the secondary side of the third transformer is connected to a first end of the sixth capacitor, and a second end of the fourth capacitor and a second end of the fifth capacitor are connected to a second end of the sixth capacitor; or the second three-phase circuit comprises a seventh switch tube, an eighth switch tube, a ninth switch tube, a tenth switch tube, an eleventh switch tube, a twelfth switch tube, a fourth capacitor, a fifth capacitor and a sixth capacitor, the seventh switch tube and the eighth switch tube are connected in series, the ninth switch tube and the tenth switch tube are connected in series, and the eleventh switch tube and the twelfth switch tube are connected in series; a first end of a secondary side of a first transformer of the three transformers is connected between the seventh switch tube and the eighth switch tube; a first end of a secondary side of a second transformer of the three transformers is connected between the ninth switch tube and the tenth switch tube; a first end of a secondary side of a third transformer of the three transformers is connected between the eleventh switch tube and the twelfth switch tube; a second end of the secondary side of the first transformer is connected to a first end of the fourth capacitor, a second end of the secondary side of the second transformer is connected to a first end of the fifth capacitor, a second end of the secondary side of the third transformer is connected to a first end of the sixth capacitor, and a second end of the fourth capacitor and a second end of the fifth capacitor are connected to a second end of the sixth capacitor; or the second three-phase circuit comprises a seventh switch tube, an eighth switch tube, a ninth switch tube, a tenth switch tube, an eleventh switch tube, a twelfth switch tube, a fourth inductor, a fifth inductor and a sixth inductor; the seventh switch tube and the eighth switch tube are connected in series, the ninth switch tube and the tenth switch tube are connected in series, and the eleventh switch tube and the twelfth switch tube are connected in series; a first end of a secondary side of a first transformer of the three transformers is connected to a first end of the fourth inductor, and a second end of the fourth inductor is connected between the seventh switch tube and the eighth switch tube; a first end of a secondary side of a second transformer of the three transformers is connected to a first end of the fifth inductor, and a second end of the fifth inductor is connected between the ninth switch tube and the tenth switch tube; a first end of a secondary side of a third transformer of the three transformers is connected to a first end of the sixth inductor, and a second end of the sixth inductor is connected between the eleventh switch tube and the twelfth switch tube; a second end of the secondary side of the first transformer and a second end of the secondary side of the second transformer are connected to a second end of the secondary side of the third transformer; or, the second three-phase circuit comprises a seventh switch tube, an eighth switch tube, a ninth switch tube, a tenth switch tube, an eleventh switch tube and a twelfth switch tube; the seventh switch tube and the eighth switch tube are connected in series, the ninth switch tube and the tenth switch tube are connected in series, and the eleventh switch tube and the twelfth switch tube are connected in series; a first end of a secondary side of a first transformer of the three transformers is connected between the seventh switch tube and the eighth switch tube, a first end of a secondary side of a second transformer of the three transformers is connected between the ninth switch tube and the tenth switch tube, a first end of a secondary side of a third transformer of the three transformers is connected between the eleventh switch tube and the twelfth switch tube, and a second end of the secondary side of the first transformer and a second end of the secondary side of the second transformer are connected to a second end of the secondary side of the third transformer.

* * * * *